United States Patent
Yahia et al.

(10) Patent No.: US 11,479,079 B2
(45) Date of Patent: Oct. 25, 2022

(54) CIRCUIT FOR THE THERMAL MANAGEMENT OF A HYBRID OR ELECTRIC VEHICLE

(71) Applicant: Valeo Systemes Thermiques, Le Mesnil-Saint-Denis (FR)

(72) Inventors: Mohamed Yahia, Le Mesnil Saint Denis (FR); Bertrand Nicolas, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 344 days.

(21) Appl. No.: 16/767,618

(22) PCT Filed: Nov. 16, 2018

(86) PCT No.: PCT/FR2018/052893
§ 371 (c)(1),
(2) Date: Oct. 16, 2020

(87) PCT Pub. No.: WO2019/106258
PCT Pub. Date: Jun. 6, 2019

(65) Prior Publication Data
US 2021/0031588 A1    Feb. 4, 2021

(30) Foreign Application Priority Data

Nov. 28, 2017 (FR) ...................... 1761296

(51) Int. Cl.
*B60H 1/00* (2006.01)
*F25B 13/00* (2006.01)
(Continued)

(52) U.S. Cl.
CPC ..... *B60H 1/00392* (2013.01); *B60H 1/00007* (2013.01); *B60H 1/00278* (2013.01);
(Continued)

(58) Field of Classification Search
CPC ............ B60H 1/00392; B60H 1/00007; B60H 1/00278; B60H 1/00428; B60H 1/00899;
(Continued)

(56) References Cited

U.S. PATENT DOCUMENTS 6,327,994 B1 * 12/2001 Labrador ................ B63B 39/06
114/382
6,481,230 B2 * 11/2002 Kimishima ............ B60K 11/06
62/238.7

(Continued)

FOREIGN PATENT DOCUMENTS

CN     105720319 A    6/2016
CN     106898841 A    6/2017
(Continued)

OTHER PUBLICATIONS

International Search Report and Written Opinion in corresponding International Application No. PCT/FR2018/052893, dated Mar. 27, 2019 (11 pages).

(Continued)

*Primary Examiner* — Ljiljana V. Ciric
(74) *Attorney, Agent, or Firm* — Osha Bergman Watanabe & Burton LLP

(57) ABSTRACT

A thermal management circuit for a hybrid or electric vehicle is disclosed. The thermal management circuit has a first reversible air conditioning loop in which a refrigerant circulates and includes a two-fluid heat exchanger arranged jointly on a second loop for the circulation of a heat-transfer fluid. The second loop for the circulation of a heat-transfer fluid includes a first circulation branch including in the direction in which the heat-transfer fluid circulates, a first pump, a first radiator arranged in an internal air flow, and a battery heat exchanger. A second circulation branch is connected in parallel with the second radiator and includes a second pump and an electric device for heating the heat- (Continued)

Figure 1:
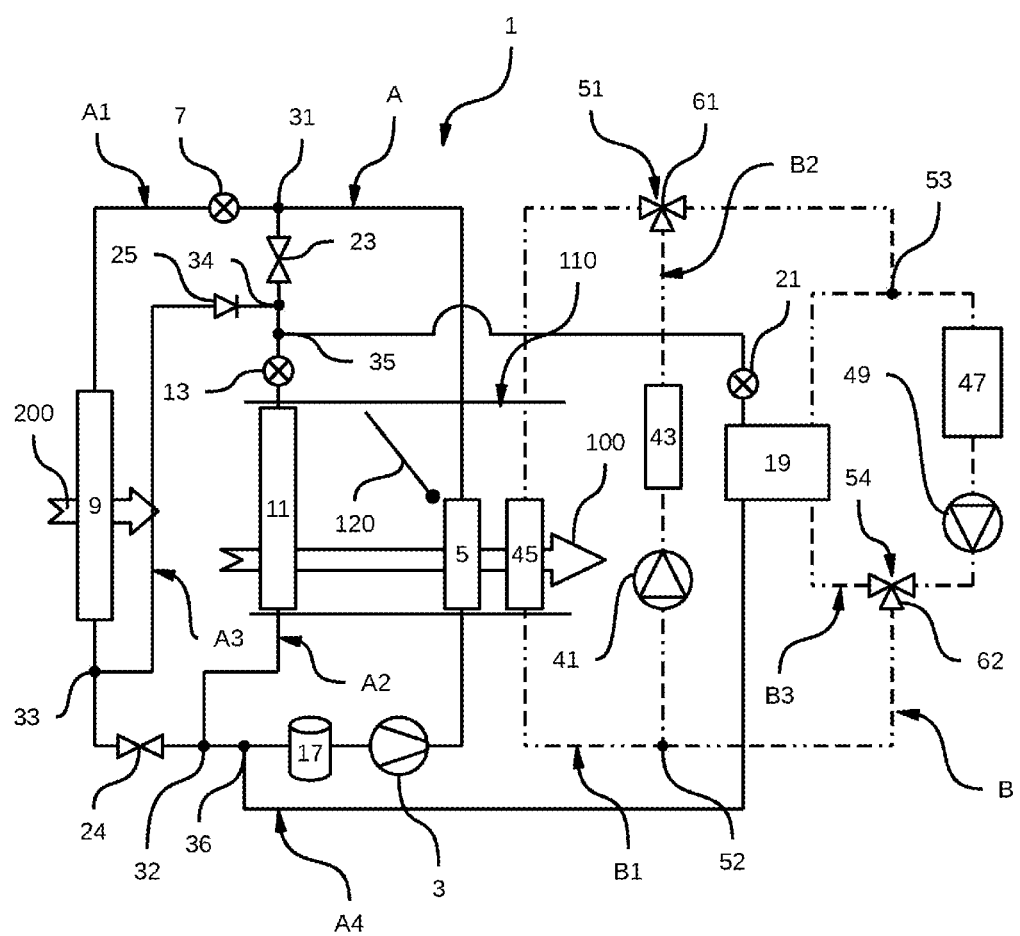

transfer fluid. A third circulation branch connected in parallel with the first pump and the battery heat exchanger includes the two-fluid heat exchanger.

10 Claims, 22 Drawing Sheets

(51) Int. Cl.
    *F25B 49/02*     (2006.01)
    *F25B 25/00*     (2006.01)
    *H01M 10/625*     (2014.01)
    *F25B 5/02*     (2006.01)
    *H01M 10/6568*     (2014.01)

(52) U.S. Cl.
    CPC ..... *B60H 1/00428* (2013.01); *B60H 1/00899* (2013.01); *B60H 1/00907* (2013.01); *B60H 1/00921* (2013.01); *F25B 5/02* (2013.01); *F25B 13/00* (2013.01); *F25B 25/005* (2013.01); *F25B 49/02* (2013.01); *H01M 10/625* (2015.04); *H01M 10/6568* (2015.04); *B60H 1/00385* (2013.01); *B60H 1/00878* (2013.01); *B60H 2001/003* (2013.01); *B60H 2001/00928* (2013.01); *B60H 2001/00949* (2013.01); *Y02E 60/10* (2013.01)

(58) Field of Classification Search
    CPC ............ B60H 1/00907; B60H 1/00921; B60H 1/00385; B60H 1/00878; B60H 2001/003; B60H 2001/00928; B60H 2001/00949; F25B 5/02; F25B 13/00; F25B 25/005; F25B 49/02; H01M 10/625; H01M 10/6568; Y02E 60/10
    See application file for complete search history.

(56) References Cited

U.S. PATENT DOCUMENTS

| | | | |
|---|---|---|---|
| 9,680,190 B1* | 6/2017 | Xia | H01M 10/663 |
| 11,331,979 B2* | 5/2022 | Jeong | H05K 7/20172 |
| 2002/0184908 A1* | 12/2002 | Brotz | B60H 1/143 |
| | | | 62/198 |
| 2005/0227126 A1* | 10/2005 | Korytnikov | H01M 8/04268 |
| | | | 429/513 |
| 2011/0296855 A1* | 12/2011 | Johnston | B60L 1/02 |
| | | | 62/160 |
| 2012/0011869 A1* | 1/2012 | Kondo | B60H 1/3213 |
| | | | 62/238.7 |
| 2012/0216983 A1* | 8/2012 | Bennion | B60L 1/02 |
| | | | 165/41 |
| 2013/0299129 A1* | 11/2013 | Osaka | B60H 1/0005 |
| | | | 165/59 |
| 2015/0101789 A1* | 4/2015 | Enomoto | B60L 1/02 |
| | | | 236/35 |
| 2016/0107508 A1* | 4/2016 | Johnston | B60H 1/00278 |
| | | | 237/12.3 A |
| 2016/0138429 A1* | 5/2016 | Son | F02M 26/25 |
| | | | 60/645 |
| 2016/0298498 A1* | 10/2016 | Kreuger | F28D 20/0034 |
| 2022/0011006 A1* | 1/2022 | Miura | B60H 1/32284 |

FOREIGN PATENT DOCUMENTS

| | | |
|---|---|---|
| DE | 112013003562 T5 | 4/2015 |
| WO | 2011015734 A1 | 2/2011 |
| WO | 2011079904 A1 | 7/2011 |

OTHER PUBLICATIONS

First Office Action in corresponding Chinese Application No. 201880085666.8, dated Jul. 5, 2021 (13 pages).

* cited by examiner

CIRCUIT FOR THE THERMAL MANAGEMENT OF A HYBRID OR ELECTRIC VEHICLE

The invention relates to the field of motor vehicles and more particularly to a thermal management circuit for a hybrid or electric motor vehicle.

In electric and hybrid vehicles, the thermal management of the passenger compartment is generally performed by a reversible air conditioning loop. Reversible is given to mean that the air conditioning loop can operate in a cooling mode in order to cool the air sent to the passenger compartment and in a heat pump mode in order to heat the air sent to the passenger compartment. This reversible air conditioning loop can also include a spur in order to manage the temperature of the batteries of the electric or hybrid vehicle. It is thus possible to heat or cool the batteries by means of the reversible air conditioning loop. However, it is not possible to at least partially manage the temperature of the batteries without using the reversible air conditioning loop. When for example there is no need to heat or cool the passenger compartment, it is thus still necessary to fully operate the reversible air conditioning loop in order to heat or cool the batteries. This results in excessive electricity consumption and can therefore affect the range of the electric or hybrid vehicle.

One of the aims of the present invention is therefore to overcome at least some of the drawbacks of the prior art and propose an improved thermal management circuit.

The present invention therefore relates to a thermal management circuit for a hybrid or electric vehicle, said thermal management circuit including a first reversible air conditioning loop in which a refrigerant circulates and including a two-fluid heat exchanger arranged jointly on a second loop for the circulation of a heat-transfer fluid, the second loop for the circulation of a heat-transfer fluid comprising:
- a first circulation branch including in the direction in which the heat-transfer fluid circulates, a first pump, a first radiator arranged in an internal air flow, and a battery heat exchanger,
- a second circulation branch connected in parallel with the second radiator and including a second pump and an electric device for heating the heat-transfer fluid,
- a third circulation branch connected in parallel with the first pump and the battery heat exchanger, said third circulation branch including the two-fluid heat exchanger.

According to one aspect of the invention, the first reversible air conditioning loop includes:
- a first circulation pipe including in the direction in which the refrigerant circulates, a compressor, a second radiator arranged in the internal air flow, a first expansion device, and an evaporator-condenser arranged in an external air flow,
- a second circulation pipe connected in parallel with the evaporator-condenser and including a second expansion device and an evaporator arranged in the internal air flow,
- a third circulation pipe connecting the outlet of the evaporator-condenser and the inlet of the second expansion device, and
- a fourth circulation pipe connecting the inlet of the second expansion device and the inlet of the compressor, said third circulation pipe including a third expansion device and the two-fluid heat exchanger.

According to another aspect of the invention, the first reversible air conditioning loop is configured to operate in a first cooling mode in which the refrigerant circulates successively in the compressor, where it experiences a pressure increase, the first radiator, through which the refrigerant passes without exchanging heat energy with the internal air flow, the first expansion device, through which the refrigerant passes without experiencing a pressure drop, and the evaporator-condenser, in which the refrigerant releases heat energy into the external air flow; the refrigerant then reaches the second expansion device, where the refrigerant experiences a pressure drop via the third circulation pipe, and the refrigerant then passes through the evaporator, where it absorbs heat energy from the internal air flow before returning to the compressor.

According to another aspect of the invention, the first reversible air conditioning loop is configured to operate in a heat pump mode in which the refrigerant circulates successively in the compressor, where it experiences a pressure increase, the first radiator, in which the refrigerant transfers heat energy to the internal air flow, the first expansion device, where it experiences a pressure drop, and the evaporator-condenser, in which the refrigerant absorbs heat energy from the external air flow before returning to the compressor.

According to another aspect of the invention, in the first circulation loop, one portion of the refrigerant passes into the fourth circulation pipe, the refrigerant experiencing a pressure drop in the third expansion device and passing through the two-fluid heat exchanger, in which it absorbs heat energy from the heat-transfer fluid in the second circulation loop, before meeting the other portion of the refrigerant upstream of the compressor.

According to another aspect of the invention, the first circulation loop is configured to operate in a second cooling mode in which the refrigerant circulates successively in the compressor, where it experiences a pressure increase, the first radiator, through which the refrigerant passes without exchanging heat energy with the internal air flow, the first expansion device, through which the refrigerant passes without experiencing a pressure drop, and the evaporator-condenser, in which the refrigerant releases heat energy into the external air flow; the refrigerant then passes into the third circulation pipe, passes into the third expansion device, where the refrigerant experiences a pressure drop, and the refrigerant then passes through the two-fluid heat exchanger, where it absorbs heat energy coming from the heat-transfer fluid before returning to the compressor.

According to another aspect of the invention, the second circulation loop is configured to operate in a battery cooling mode in which the heat-transfer fluid circulates successively in the second pump and the electric heating device, through which the heat-transfer fluid passes without being heated, the heat-transfer fluid then circulating in the battery heat exchanger, where it absorbs heat energy from the batteries before passing into the first pump, the refrigerant also circulating in the third circulation branch and thus passing through the two-fluid heat exchanger, in which the heat-transfer fluid transfers heat energy to the refrigerant.

According to another aspect of the invention, the second circulation loop is configured to operate in a direct internal air flow heating mode in which the heat-transfer fluid circulates successively in the second pump, the electric heating device, in which the heat-transfer fluid is heated, and the first radiator, in which the heat-transfer fluid heats the internal air flow.

According to another aspect of the invention, the second circulation loop is configured to operate in a short operating mode in which the heat-transfer fluid circulates successively in the first pump, the two-fluid heat exchanger, and the battery heat exchanger.

According to another aspect of the invention, the second circulation loop is configured to operate in a passenger compartment and battery heating mode in which the heat-transfer fluid circulates successively in the second pump and the electric heating device, in which the heat-transfer fluid is heated, a first portion of the heat-transfer fluid then passing into the battery heat exchanger, in which the heat-transfer fluid heats the batteries, and into the first pump, a second portion of the heat-transfer fluid then passing into the first radiator, in which the heat-transfer fluid heats the internal air flow, the two portions of the heat-transfer fluid meeting upstream of the second pump.

Figure 18:
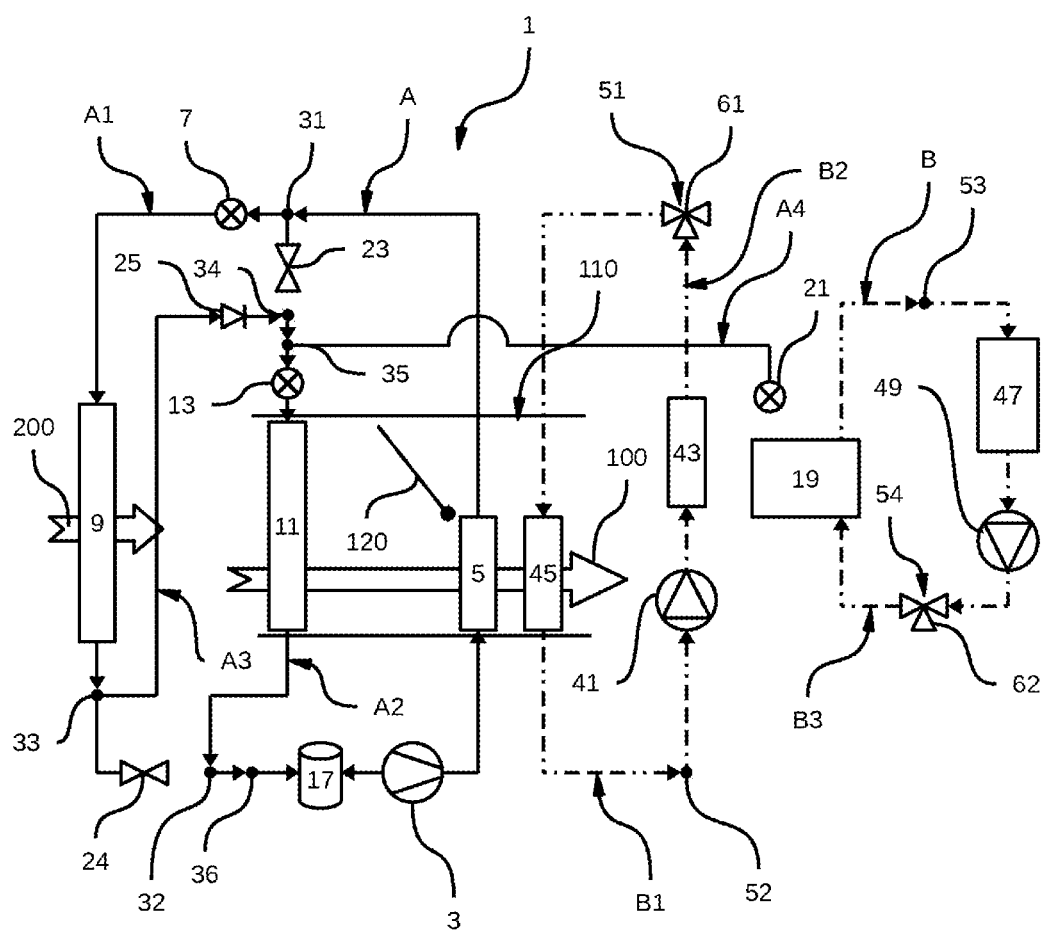
Figure 19:
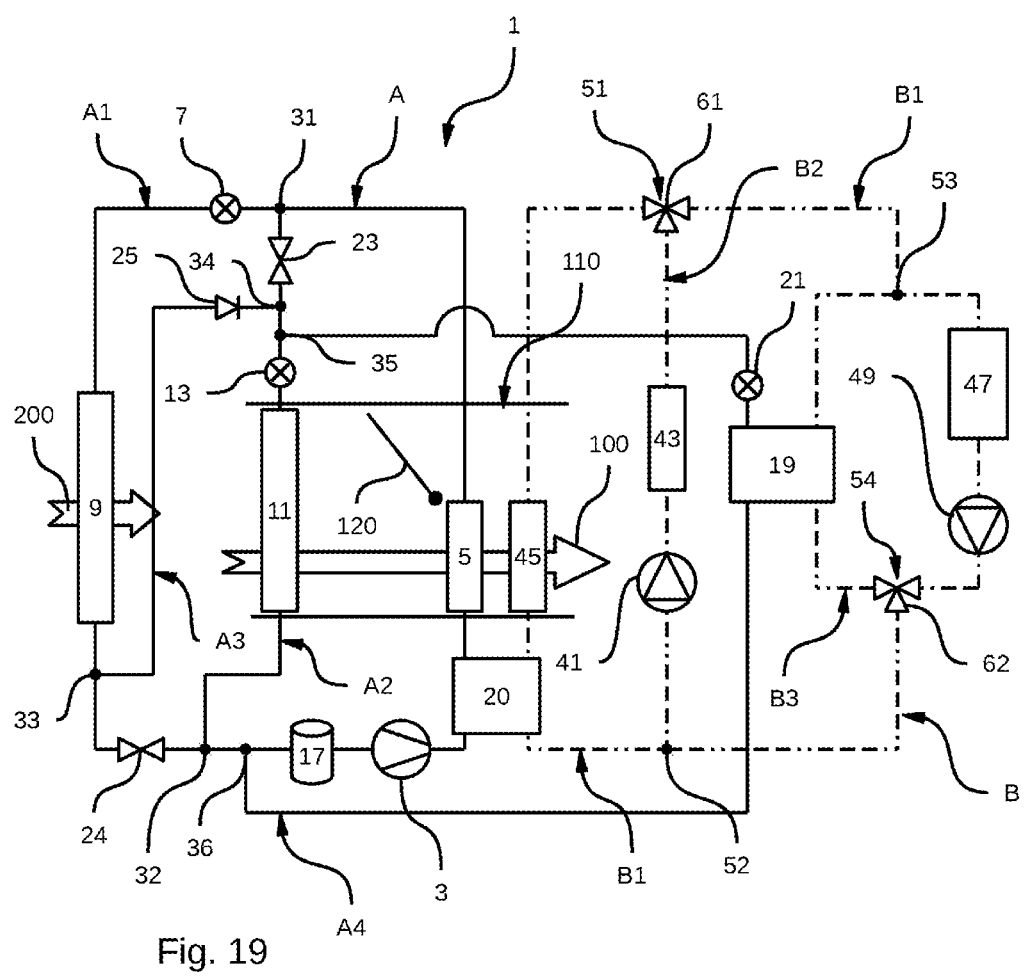
Figure 20:
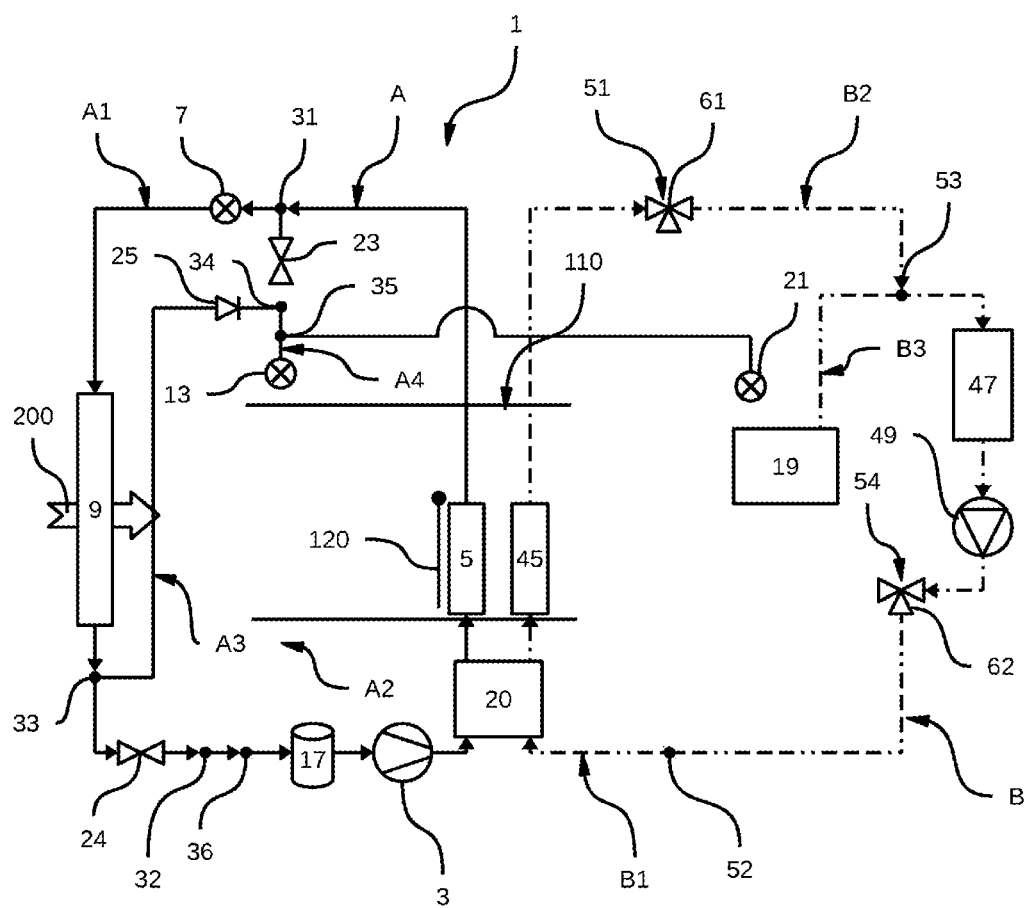

Further features and advantages of the invention will become more clearly apparent from reading the following description, given by way of non-limiting illustrative example, and from the attached drawings, in which:

FIG. 1 is a schematic depiction of a thermal management circuit according to a first embodiment, FIGS. 2 to 18 show the thermal management circuit of FIG. 1 according to different operating modes, FIG. 19 is a schematic depiction of a thermal management circuit according to a second embodiment, FIG. 20 shows the thermal management circuit of FIG. 1 according to a particular operating mode.

In the various figures, identical elements bear the same reference numbers.

The following embodiments are examples. Although the description refers to one or more embodiments, this does not necessarily mean that each reference relates to the same embodiment, or that the features apply only to just one embodiment. Single features of different embodiments can also be combined and/or interchanged in order to create other embodiments.

In the present description, certain elements or parameters can be given ordinal numbers such as, for example, first element or second element, first parameter and second parameter, or first criterion and second criterion, etc. In this case, the ordinal numbering is simply to differentiate between and denote elements, parameters or criteria that are similar but not identical. This ordinal numbering does not imply any priority of one element, parameter or criterion over another and such numbering can easily be interchanged without departing from the scope of the present description. Likewise, this ordinal numbering does not imply any chronological order for example in assessing any given criterion.

In the present description, "positioned upstream" is given to mean that an element is positioned before another with respect to the direction in which a fluid circulates. Conversely, "positioned downstream" is given to mean that an element is positioned after another with respect to the direction in which the fluid circulates.

FIG. 1 shows a circuit 1 for the thermal management of a hybrid or electric vehicle. This thermal management circuit 1 includes a first reversible air conditioning loop A in which a refrigerant circulates and including a two-fluid heat exchanger 19 arranged jointly on a second loop B for the circulation of a heat-transfer fluid.

This second loop B for the circulation of a heat-transfer fluid comprises more particularly a first circulation branch B1 including in the direction in which the heat-transfer fluid circulates, a battery heat exchanger 47, a first pump 49 and a first radiator 45 arranged in an internal air flow 100. The battery heat exchanger 47 is in particular a heat exchanger enabling exchanges of heat energy between the batteries, more particularly the cells forming these batteries, and the heat-transfer fluid circulating in the second circulation loop B. The first radiator 45 is preferably arranged in a heating, ventilation and/or air conditioning device 110 through which the internal air flow 100 circulates.

The second circulation loop B includes a second circulation branch B2 connected in parallel with the second radiator 45. This second circulation branch B2 connects more specifically:

a first connection point 51 arranged upstream of the battery heat exchanger 47, between the first radiator 45 and said battery heat exchanger 47, and a second connection point 52 arranged downstream of the first pump 49, between said first pump 49 and the first radiator 45.

This second circulation branch B2 includes in particular a second pump 41 and an electric device 43 for heating the heat-transfer fluid.

The second circulation loop B also includes a third circulation branch B3 connected in parallel with the first pump 49 and the battery heat exchanger 47. This third circulation branch B3 connects more specifically:

a third connection point 53 arranged upstream of the battery heat exchanger 47, between the first connection point 51 and said battery heat exchanger 47, and a fourth connection point 54 arranged downstream of the first pump 49, between said first pump 49 and the second connection point 52.

This third circulation branch B3 includes in particular the two-fluid heat exchanger 19.

The second circulation loop B also includes a device for redirecting the heat-transfer fluid in order to define the circulation branch through which it circulates. In the example illustrated in FIG. 1, this heat-transfer fluid redirection device includes a first three-way valve 61 arranged at the first connection point 51 and a second three-way valve 62 arranged at the fourth connection point 54. It is however entirely possible to envisage other means in order to define the circulation branch through which the heat-transfer fluid circulates, such as for example shut-off valves arranged strategically on the different circulation branches B1, B2 and B3.

The first reversible air conditioning loop A includes more particularly a first circulation pipe A1 including in the direction in which the refrigerant circulates, a compressor 3, a second radiator 5 arranged in the internal air flow 100, a first expansion device 7, and an evaporator-condenser 9 arranged in an external air flow 200. The evaporator-condenser 9 is thus generally arranged on the front face of the motor vehicle and the second radiator 5 in the heating, ventilation and/or air conditioning device 110. A flap 120 can also be installed in the heating, ventilation and/or air conditioning device 110 in order to prevent the internal air flow 100 from passing through the second radiator 5 or to allow it to do so. The first circulation pipe A1 can also include an accumulator 17 allowing a phase separation of the refrigerant and arranged upstream of the compressor 3, between the evaporator-condenser 9 and said compressor 3.

The first circulation loop A also includes a second circulation pipe A2 connected in parallel with the evaporator-condenser 9. This second circulation pipe A2 connects more particularly:

a first junction point 31 arranged downstream of second radiator 5, between said second radiator 5 and the first expansion device 7, and a second junction point 32 arranged downstream of the evaporator-condenser 9, between said evaporator-condenser 9 and the compressor 3, more specifically upstream of the accumulator 17.

This second circulation pipe A2 includes in particular a second expansion device 13 and an evaporator 11 arranged in the internal air flow 100.

The first circulation loop A further includes a third circulation pipe A3 connecting the outlet of the evaporator-condenser 9 and the inlet of the second expansion device 13. This third circulation pipe A3 connects more particularly:

a third junction point 33 arranged downstream of the evaporator-condenser 9, between said evaporator-condenser 9 and the compressor 3, more specifically upstream of the accumulator 17, and a fourth junction point 34 arranged on the second circulation pipe A2 upstream of the second expansion device 13, between the first junction point 31 and the second expansion device 13.

The first circulation loop A also includes a fourth circulation pipe A4 connecting the inlet of the second expansion device 13 and the inlet of the compressor 3. This fourth circulation pipe A4 specifically connects:

a fifth junction point 35 arranged on the second circulation pipe A2 upstream of the second expansion device 13, between the fourth junction point 34 of the third circulation pipe A3 and said second expansion device 13, and a sixth junction point 36 arranged upstream of the compressor 3, between the second junction point 32 of the second circulation pipe A2 and the compressor 3, more specifically upstream of the accumulator 17.

The third circulation pipe A4 includes in particular a third expansion device 21 and the two-fluid heat exchanger 19. The third expansion device 21 is arranged upstream of the two-fluid heat exchanger 19, between the fifth junction point 35 and said two-fluid heat exchanger 19.

The first circulation loop A also includes a device for redirecting the refrigerant in order to define the circulation pipe through which it circulates. In the example illustrated in FIG. 1, this refrigerant redirection device includes in particular:

a first shut-off valve 23 arranged on the second circulation pipe A2 between the first junction point 31 and the fourth junction point 34, a second shut-off valve 24 arranged on the first circulation pipe A1 between the third junction point 33 and the second junction point 32, a non-return valve 25 arranged on the third circulation pipe A3, arranged so that it prevents the circulation of refrigerant from the fourth junction point 34 towards the third junction point 33.

The first 7, second 13 and third 21 expansion devices include a shut-off function that makes it possible to prevent the refrigerant from passing through them.

It is however entirely possible to envisage other means in order to define the circulation pipe through which the refrigerant circulates, such as for example three-way valves arranged strategically on junction points.

The thermal management circuit 1 as described above is suitable for operating according to different operating modes illustrated in FIGS. 2 to 18. In these operating modes, only the elements through which the different fluids pass are shown.

1) Cooling of the Passenger Compartment Only

Figure 2:
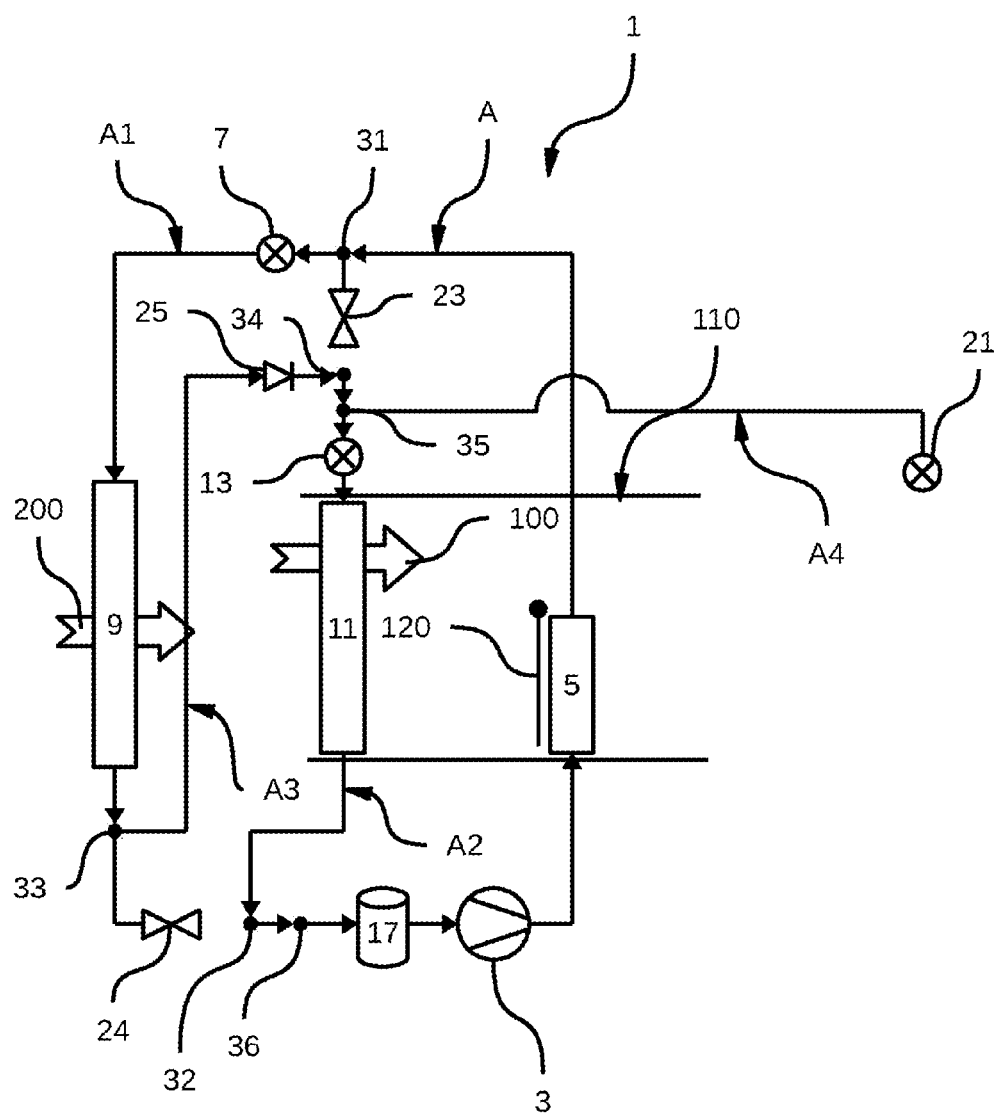
Figure 3:
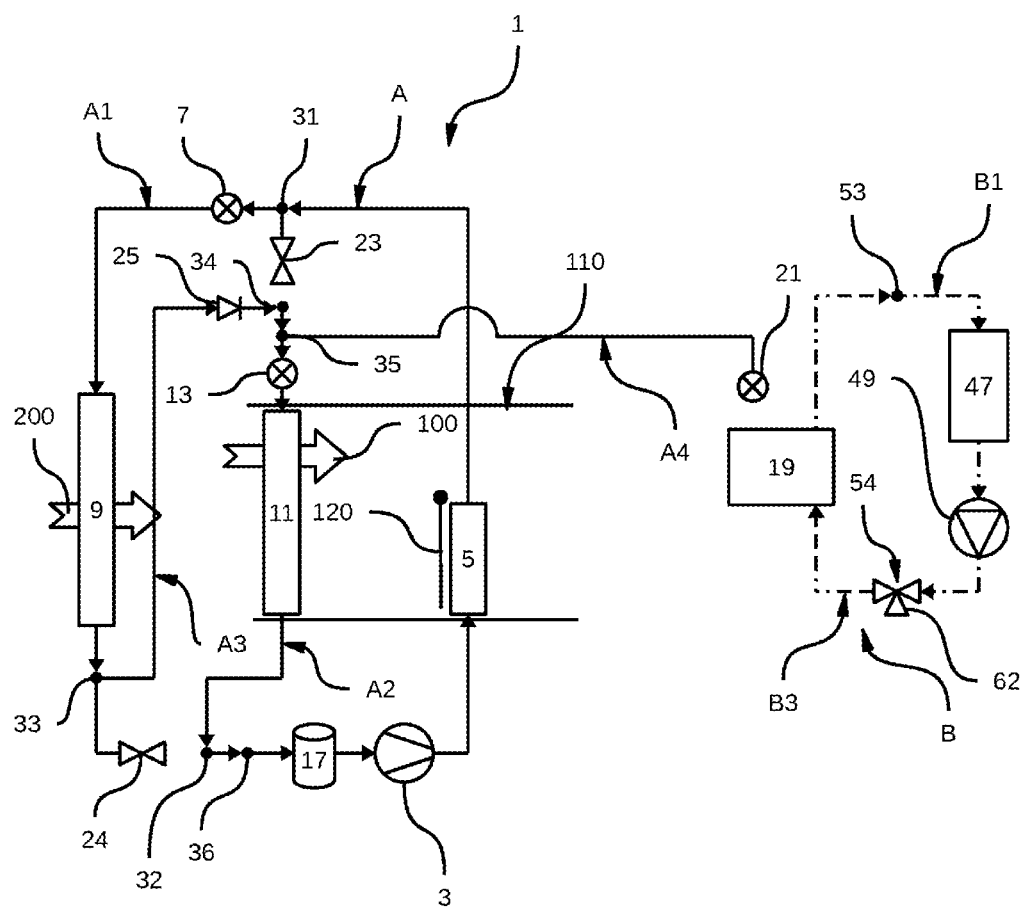

FIGS. 2 and 3 show the thermal management circuit 1 according to an operating mode in which only the passenger compartment is cooled.

As illustrated in FIGS. 2 and 3, the first circulation loop A is in a first cooling mode in which the refrigerant circulates successively in:

the compressor 3, where it experiences a pressure increase, the first radiator 5, through which the refrigerant passes without exchanging heat energy with the internal air flow 100, for example because the flap 120 is closed, the first expansion device 7, through which the refrigerant passes without experiencing a pressure drop, for example because at its maximum opening, the first expansion device 7 can let the refrigerant through without a pressure drop, the evaporator-condenser 9, in which the refrigerant releases heat energy into the external air flow 200, the third circulation pipe A3, the second expansion device 13, in which the refrigerant experiences a pressure drop, the evaporator 11, in which the refrigerant absorbs heat energy from the internal air flow 100 before returning to the compressor 3.

For the refrigerant to follow this path, the first 23 and second 24 shut-off valves are closed and the third expansion device 21 blocks the circulation of the refrigerant in the fourth circulation pipe A4.

In the example illustrated in FIG. 2, only the first circulation loop A is operating. The second circulation loop B is stopped.

In the example illustrated in FIG. 3, the second circulation loop B is running and is in a so-called short operating mode. In this short operating mode, the heat-transfer fluid circulates successively in the first pump 49, the two-fluid heat exchanger 19 and the battery heat exchanger 47.

In the case illustrated in FIG. 3, the heat-transfer fluid cannot exchange heat energy with the refrigerant as the refrigerant is not circulating in the fourth circulation pipe A4. Circulating the heat-transfer fluid according to this short operating mode nevertheless makes it possible to homogenize the temperature within the batteries so that the different cells forming them are at the same temperature.

This short operating mode without heat exchange in the two-fluid heat exchanger 19 can also be used without the first circulation loop A being in operation.

Figure 4A:
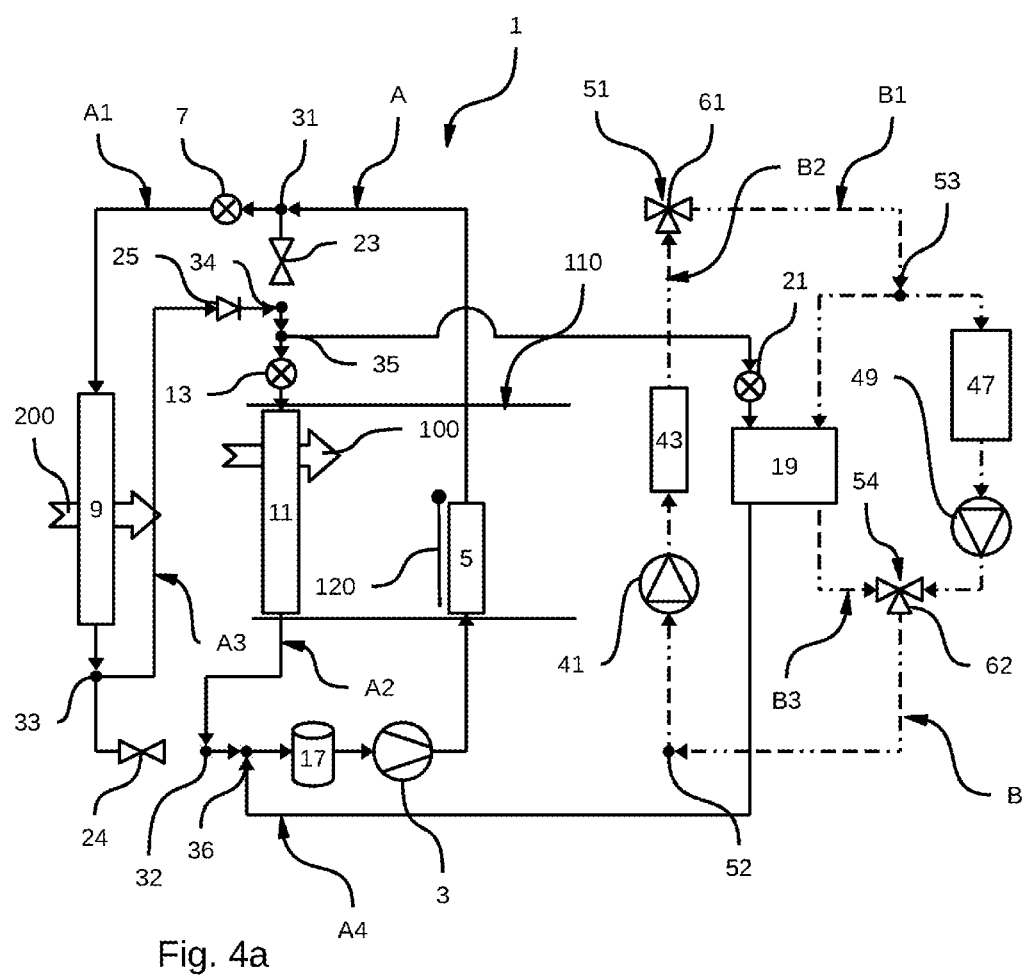
Figure 4B:
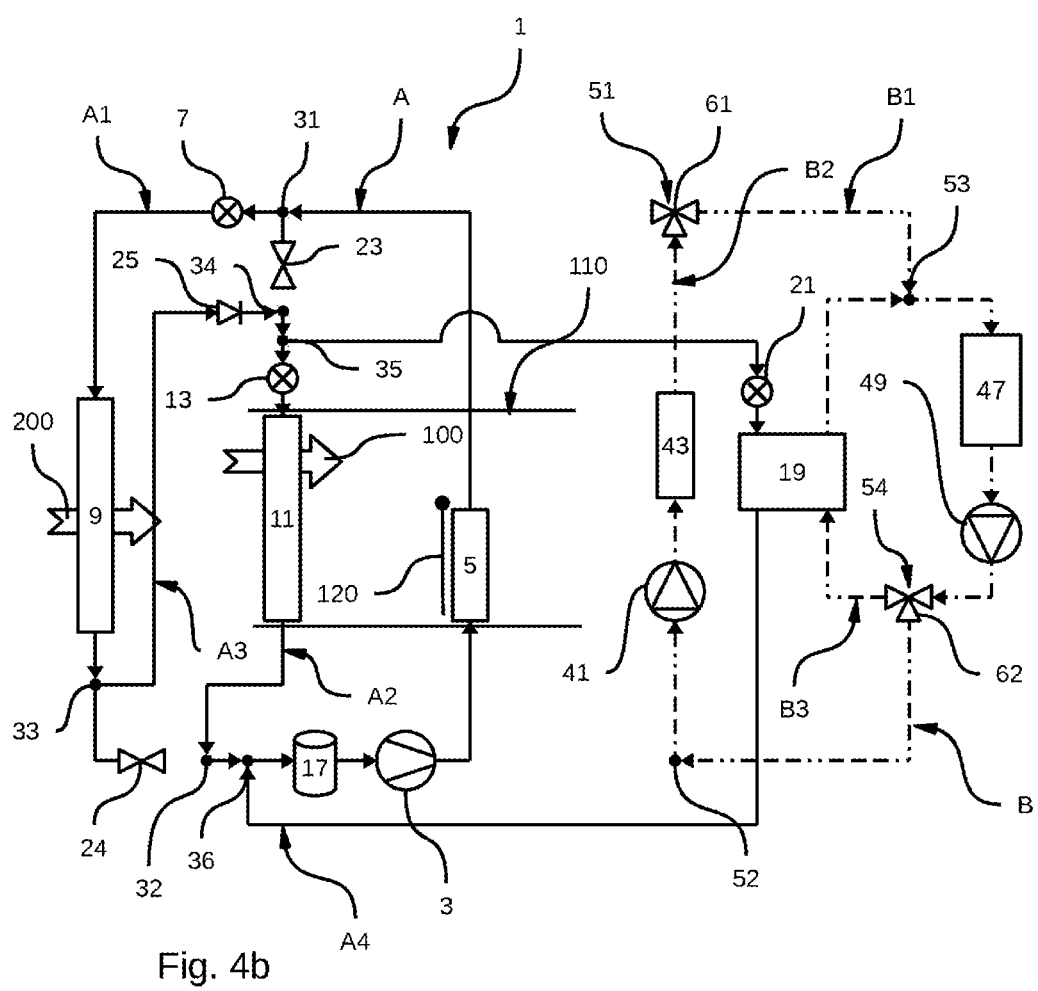
Figure 5:
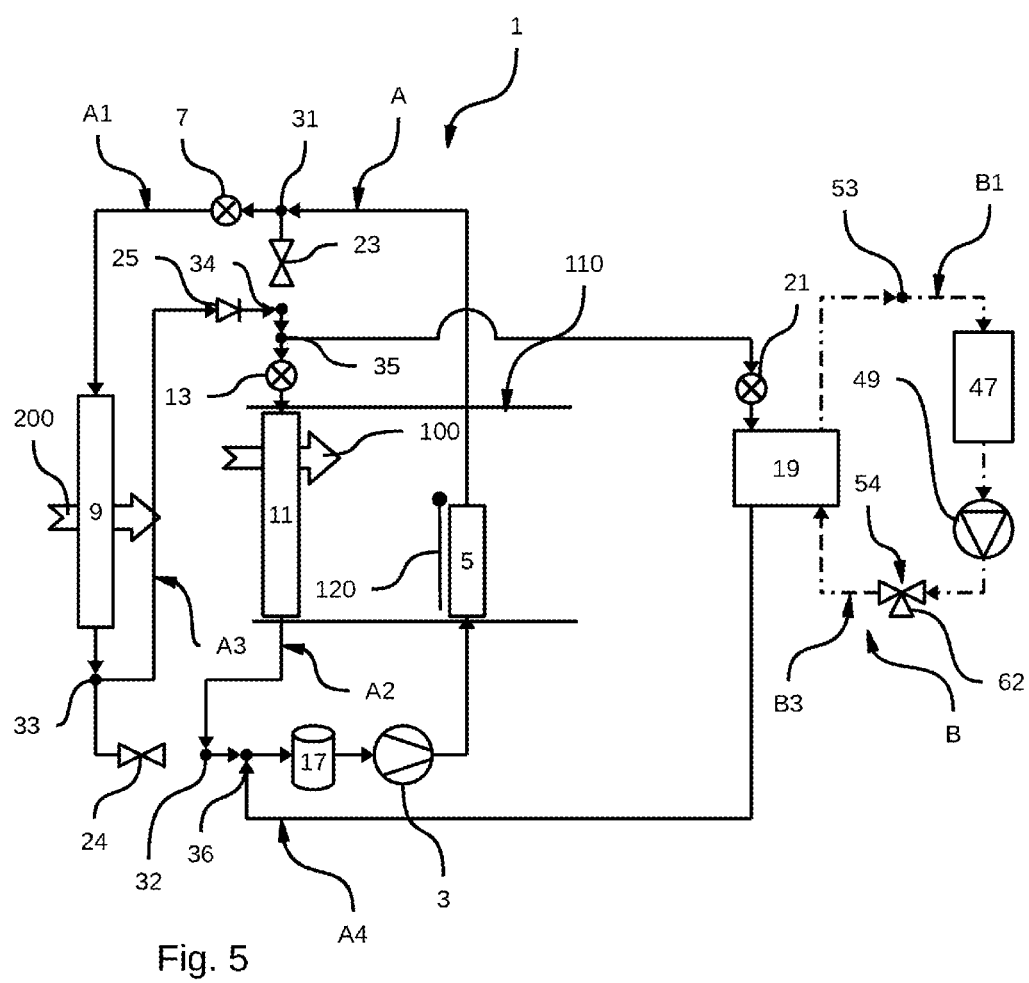

2) Cooling of the Passenger Compartment and the Batteries:

FIGS. 4 and 5 show the thermal management circuit 1 according to operating modes in which the passenger compartment and the batteries are cooled. For this, the first circulation loop A and the second circulation loop B are in operation.

In both FIG. 4 and FIG. 5, the first circulation loop A is in the first cooling mode as described above, with the difference that one portion of the refrigerant passes into the fourth circulation pipe A4. This portion of the refrigerant experiences a pressure drop in the third expansion device 21 and passes through the two-fluid heat exchanger 19, in which it absorbs heat energy from the heat-transfer fluid in the second circulation loop B before meeting the other portion of the refrigerant upstream of the compressor 3.

In this passenger compartment and battery cooling mode, the portion of the refrigerant passing through the fourth circulation pipe A4 comes from the third circulation pipe A3, more specifically from the evaporator-condenser 9.

As shown in FIGS. 4a and 4b, the second circulation loop B is configured to operate in a battery cooling mode. In this battery cooling mode, the heat-transfer fluid circulates successively in the second pump 41 and the electric heating device 43, through which the heat-transfer fluid passes without being heated, particularly because the electric heating device is not supplied with electricity and is not therefore producing heat.

The heat-transfer fluid then circulates in the battery heat exchanger 47, where it absorbs heat energy from the batteries before passing into the first pump 49.

The refrigerant also circulates in the third circulation branch B3 and thus passes through the two-fluid heat exchanger 19, in which the heat-transfer fluid transfers heat energy to the refrigerant.

The fact that the heat-transfer fluid is propelled by both the first 49 and the second 41 pumps makes it possible to control the flow rate of the heat-transfer fluid passing through the two-fluid heat exchanger 19 and the battery heat exchanger 47. The second pump 41 makes it possible to define and control the flow rate of heat-transfer fluid passing through the two-fluid heat exchanger 19, and the first pump 49 makes it possible to define and control the flow rate of heat-transfer fluid passing through the battery heat exchanger 47. It is thus possible, by controlling these heat-transfer fluid flow rates, to accurately control the battery cooling capacity. Generally, the flow rate of the heat-transfer fluid passing through the two-fluid heat exchanger 19 is lower than the flow rate of the heat-transfer fluid passing through the battery heat exchanger 47.

In the example in FIG. 4a, at the third junction point 53, a first portion of the refrigerant passes through the battery heat exchanger 47 and the first pump 49. The other portion of the refrigerant passes into the third circulation branch B3 and thus passes through the two-fluid heat exchanger 19, in which the heat-transfer fluid transfers heat energy to the refrigerant. The two portions of the refrigerant meet at the fourth junction point 54. This is in particular possible through the use in this example of a second so-called convergent three-way valve 62. In this example, the flow rate of the refrigerant given by the second pump 41 is then equal to the sum of the flow rate of the refrigerant in the battery heat exchanger 47 and the flow rate of the refrigerant in the two-fluid heat exchanger 19. It is then possible to control the flow rate in the two-fluid heat exchanger 19 and in the battery heat exchanger 47 by controlling the flow rate of the second pump 41.

In the example in FIG. 4b, at the fourth junction point 54, a first portion of the refrigerant passes through the second pump 41 and the electric heating device 43, through which the heat-transfer fluid passes without being heated. The other portion of the refrigerant passes into the third circulation branch B3 and thus passes through the two-fluid heat exchanger 19, in which the heat-transfer fluid transfers heat energy to the refrigerant. The two portions of the refrigerant meet at the third junction point 53. This is in particular possible through the use in this example of a second so-called divergent three-way valve 62. In this example, the flow rate of the refrigerant given by the first pump 49 is then equal to the sum of the flow rate of the refrigerant in the two-fluid heat exchanger 19 and the flow rate of the refrigerant given by the second pump 41. Here, the flow rate in the battery heat exchanger 47 is controlled by the flow rate of the first pump 49 and the flow rate in the two-fluid heat exchanger 19 is controlled by the difference in flow rate between the first 49 and second 41 pumps.

As shown in FIG. 5, the second circulation loop B can conversely operate in a short operating mode described above in which the heat-transfer fluid circulates successively in the first pump 49, the two-fluid heat exchanger 19, and the battery heat exchanger 47.

In the case illustrated in FIG. 4, in the battery heat exchanger 47, the heat-transfer fluid absorbs heat energy coming from the batteries. This heat energy is then transferred to the refrigerant in the two-fluid heat exchanger.

Figure 6:
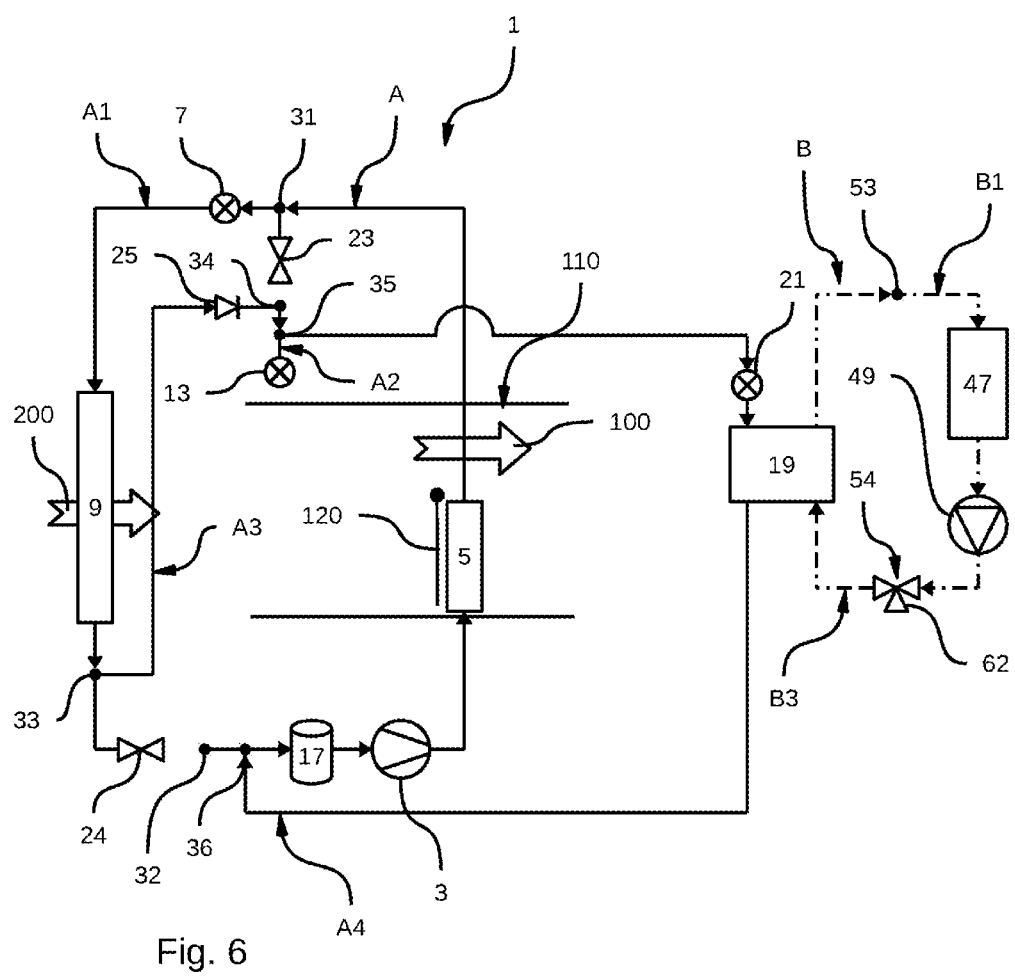

3) Cooling of the Batteries Only:

FIGS. 6 and 7 show the thermal management circuit 1 according to an operating mode in which only the batteries are cooled.

As illustrated in FIGS. 6 and 7, the first circulation loop A is in a second cooling mode in which the refrigerant circulates successively in:
the compressor 3, where it experiences a pressure increase,
the first radiator 5, through which the refrigerant passes without exchanging heat energy with the internal air flow 100, for example because the flap 120 is closed,
the first expansion device 7, through which the refrigerant passes without experiencing a pressure drop, for example because at its maximum opening, the first expansion device 7 can let the refrigerant through without a pressure drop,
the evaporator-condenser 9, in which the refrigerant releases heat energy into the external air flow 200,
the third circulation pipe A3,
the third expansion device 21, in which the refrigerant experiences a pressure drop,
the two-fluid heat exchanger 19, in which the refrigerant absorbs heat energy from the heat-transfer fluid before returning to the compressor 3.

In the example illustrated in FIG. 6, the second circulation loop B is in its short operating mode and the heat-transfer fluid circulates successively in the first pump 49, the two-fluid heat exchanger 19, and the battery heat exchanger 47. The heat-transfer fluid absorbs the heat energy coming from the batteries and this heat energy is then transferred to the refrigerant in the two-fluid heat exchanger 19.

Figure 7A:
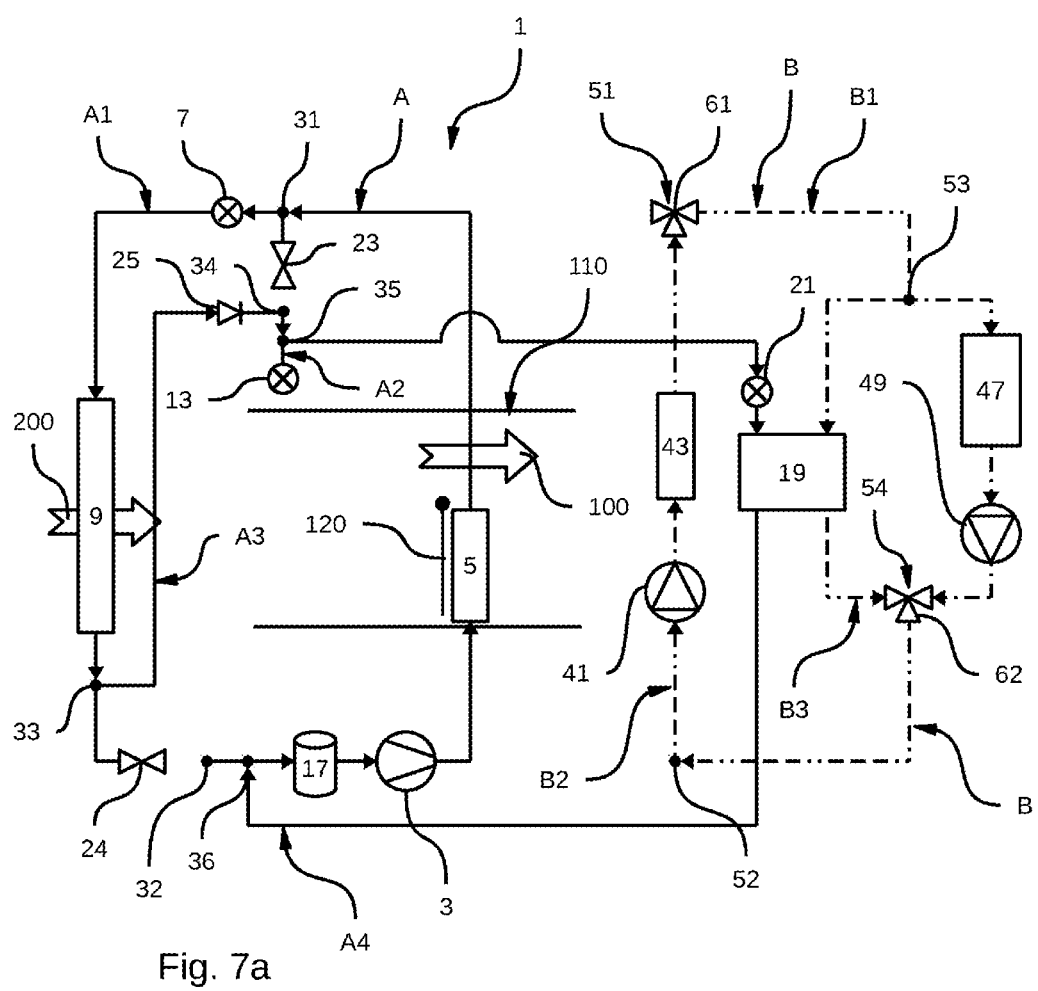
Figure 7B:
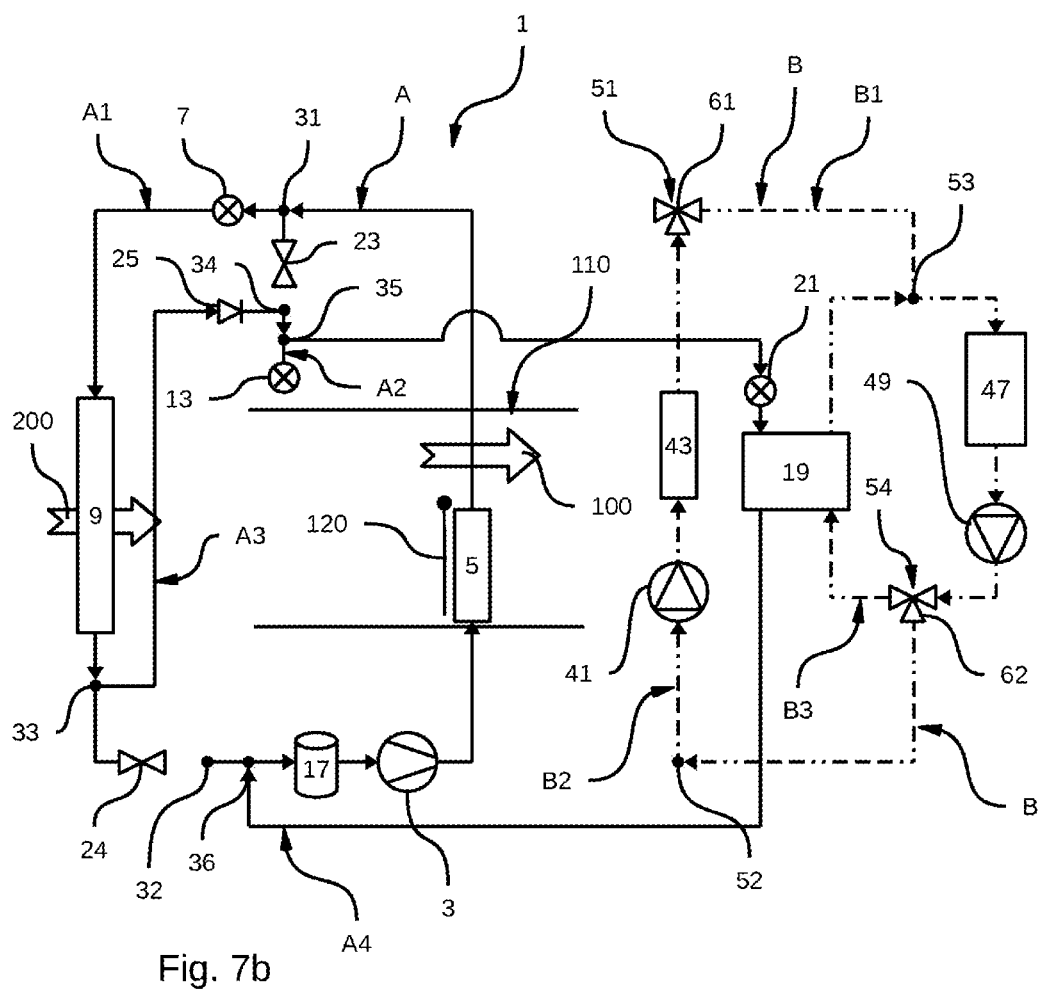

As shown in FIGS. 7a and 7b, the second circulation loop B is configured to operate in its battery cooling mode. In this battery cooling mode, the heat-transfer fluid circulates successively in the second pump 41 and the electric heating device 43, through which the heat-transfer fluid passes without being heated, particularly because the electric heating device is not supplied with electricity and is not therefore producing heat.

The heat-transfer fluid then circulates in the battery heat exchanger 47, where it absorbs heat energy from the batteries before passing into the first pump 49.

The refrigerant also circulates in the third circulation branch B3 and thus passes through the two-fluid heat exchanger 19, in which the heat-transfer fluid transfers heat energy to the refrigerant.

As above, the fact that the heat-transfer fluid is propelled by both the first 49 and the second 41 pumps makes it possible to control the flow rate of the heat-transfer fluid passing through the two-fluid heat exchanger 19 and the battery heat exchanger 47. The second pump 41 makes it possible to define and control the flow rate of heat-transfer fluid passing through the two-fluid heat exchanger 19, and the first pump 49 makes it possible to define and control the flow rate of heat-transfer fluid passing through the battery heat exchanger 47. It is thus possible, by controlling these heat-transfer fluid flow rates, to accurately control the battery cooling capacity. Generally, the flow rate of the heat-transfer fluid passing through the two-fluid heat exchanger 19 is lower than the flow rate of the heat-transfer fluid passing through the battery heat exchanger 47.

In the example in FIG. 7a, at the third junction point 53, a first portion of the refrigerant passes through the battery heat exchanger 47 and the first pump 49. The other portion of the refrigerant passes into the third circulation branch B3 and thus passes through the two-fluid heat exchanger 19, in which the heat-transfer fluid transfers heat energy to the refrigerant. The two portions of the refrigerant meet at the fourth junction point 54. This is in particular possible through the use in this example of a second so-called convergent three-way valve 62. In this example, the flow rate of the refrigerant given by the second pump 41 is then equal to the sum of the flow rate of the refrigerant in the battery heat exchanger 47 and the flow rate of the refrigerant in the two-fluid heat exchanger 19. It is then possible to control the flow rate in the two-fluid heat exchanger 19 and in the battery heat exchanger 47 by controlling the flow rate of the second pump 41.

In the example in FIG. 7b, at the fourth junction point 54, a first portion of the refrigerant passes through the second pump 41 and the electric heating device 43, through which the heat-transfer fluid passes without being heated. The other portion of the refrigerant passes into the third circulation branch B3 and thus passes through the two-fluid heat exchanger 19, in which the heat-transfer fluid transfers heat energy to the refrigerant. The two portions of the refrigerant meet at the third junction point 53. This is in particular possible through the use in this example of a second so-called divergent three-way valve 62. In this example, the flow rate of the refrigerant given by the first pump 49 is then equal to the sum of the flow rate of the refrigerant in the two-fluid heat exchanger 19 and the flow rate of the refrigerant given by the second pump 41. Here, the flow rate in the battery heat exchanger 47 is controlled by the flow rate of the first pump 49 and the flow rate in the two-fluid heat exchanger 19 is controlled by the difference in flow rate between the first 49 and second 41 pumps.

Figure 8:
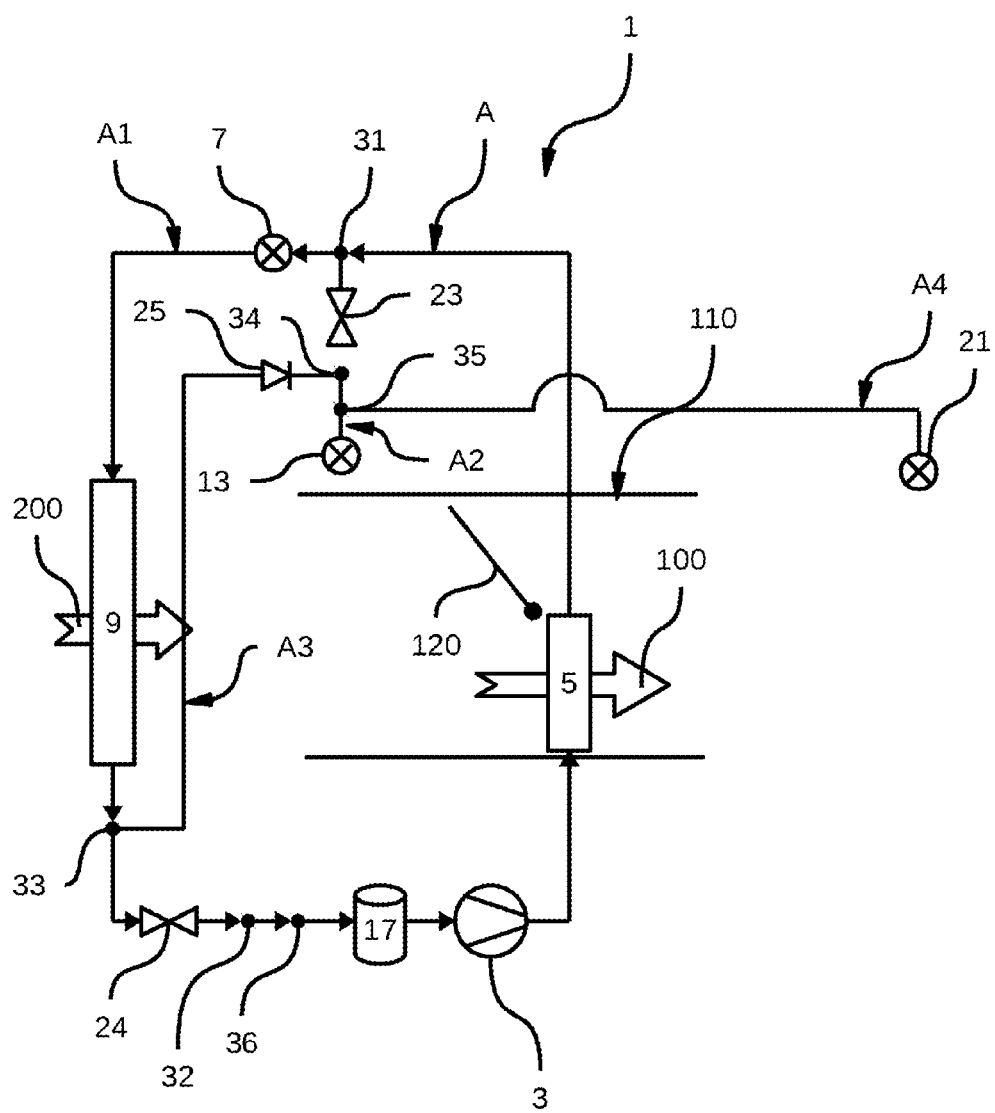
Figure 9:
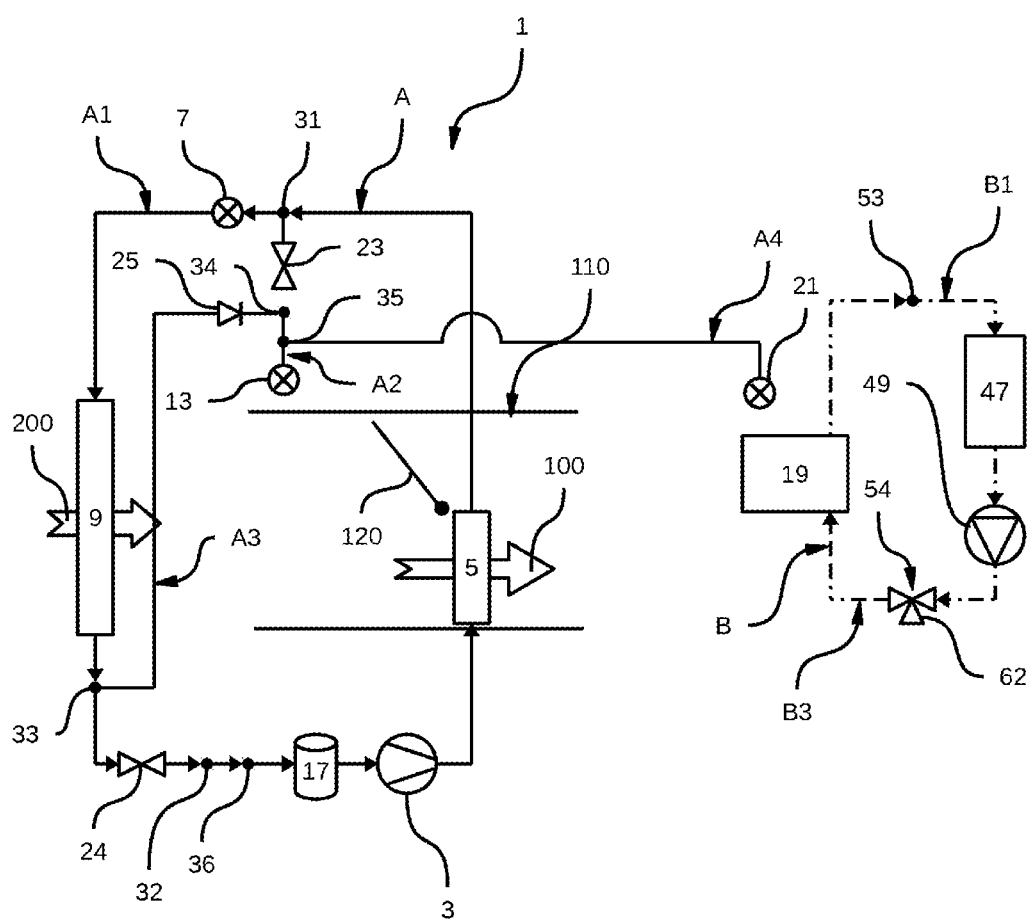
Figure 10:
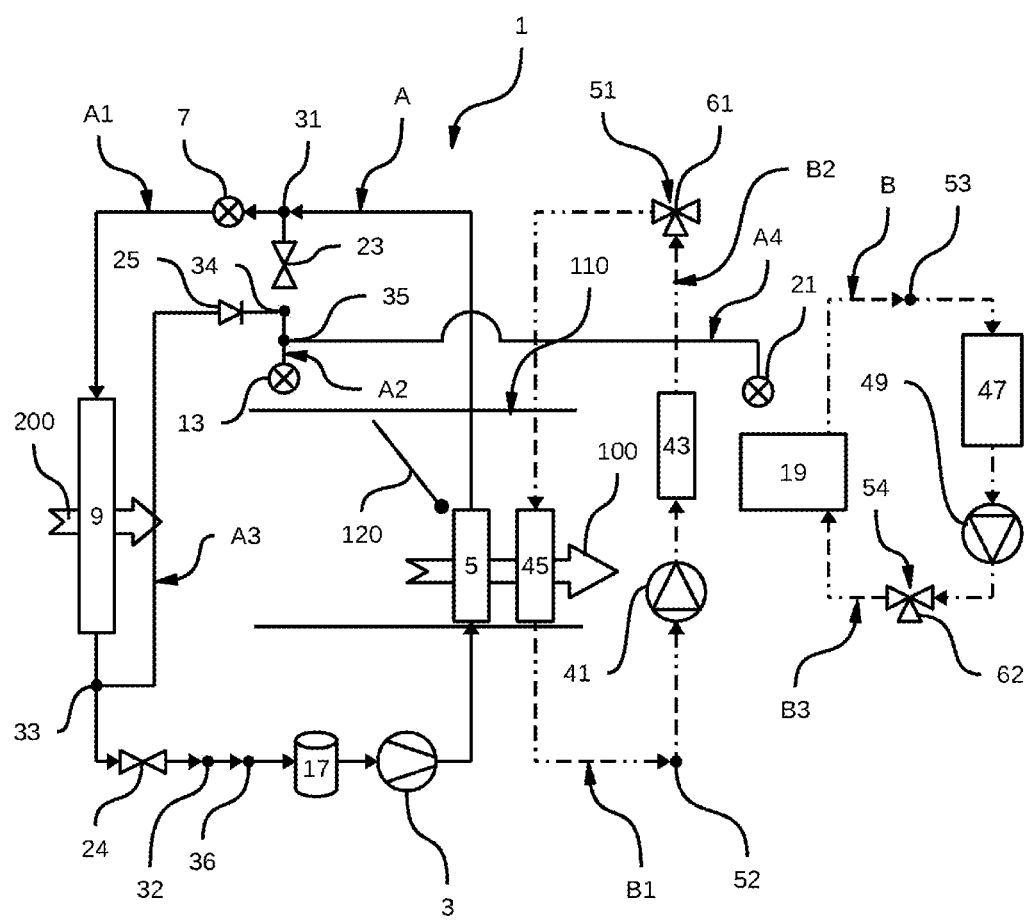

4) Heating of the Passenger Compartment Only:

FIGS. 8 to 10 show the thermal management circuit 1 according to an operating mode in which only the passenger compartment is heated.

As illustrated in FIGS. 8 to 10, the first circulation loop A is in a heat pump mode in which the refrigerant circulates successively in:
  the compressor 3, where the refrigerant experiences a pressure increase,
  the first radiator 5, in which the refrigerant transfers heat energy to the internal air flow 100, because for example the flap 120 is open,
  the first expansion device 7, in which the refrigerant experiences a pressure drop,
  the evaporator-condenser 9, in which the refrigerant absorbs heat energy from the external air flow 200 before returning to the compressor 3.

For the refrigerant to follow this path, the first shut-off valve 23 is closed, the second 13 and third 21 expansion valves block the circulation of the refrigerant and the second shut-off valve 24 is open.

In the example illustrated in FIG. 8, only the first circulation loop A is operating. The second circulation loop B is stopped.

In the example illustrated in FIG. 9, the second circulation loop B is running and is in its short operating mode in which the heat-transfer fluid circulates successively in the first pump 49, the two-fluid heat exchanger 19, and the battery heat exchanger 47.

In the case illustrated in FIG. 9, the heat-transfer fluid cannot exchange heat energy with the refrigerant as the refrigerant is not circulating in the fourth circulation pipe A4. Circulating the heat-transfer fluid according to this short operating mode makes it possible to homogenize the temperature within the batteries so that the different cells forming them are at the same temperature.

As shown in FIG. 10, the second circulation loop B can also be in a mode for the direct heating of the internal air flow 100. For this, the heat-transfer fluid circulates successively in the first pump 41, the electric heating device 43, which is operating and heats the heat-transfer fluid, and the first radiator 45, in which the heat-transfer fluid releases heat energy into the internal air flow 100.

Again, as shown in FIG. 10, this direct heating mode of the second circulation loop B can take place simultaneously with its short operating mode. In this case, there are two separate heat-transfer fluid circulation loops within the second circulation loop B.

Figure 11:
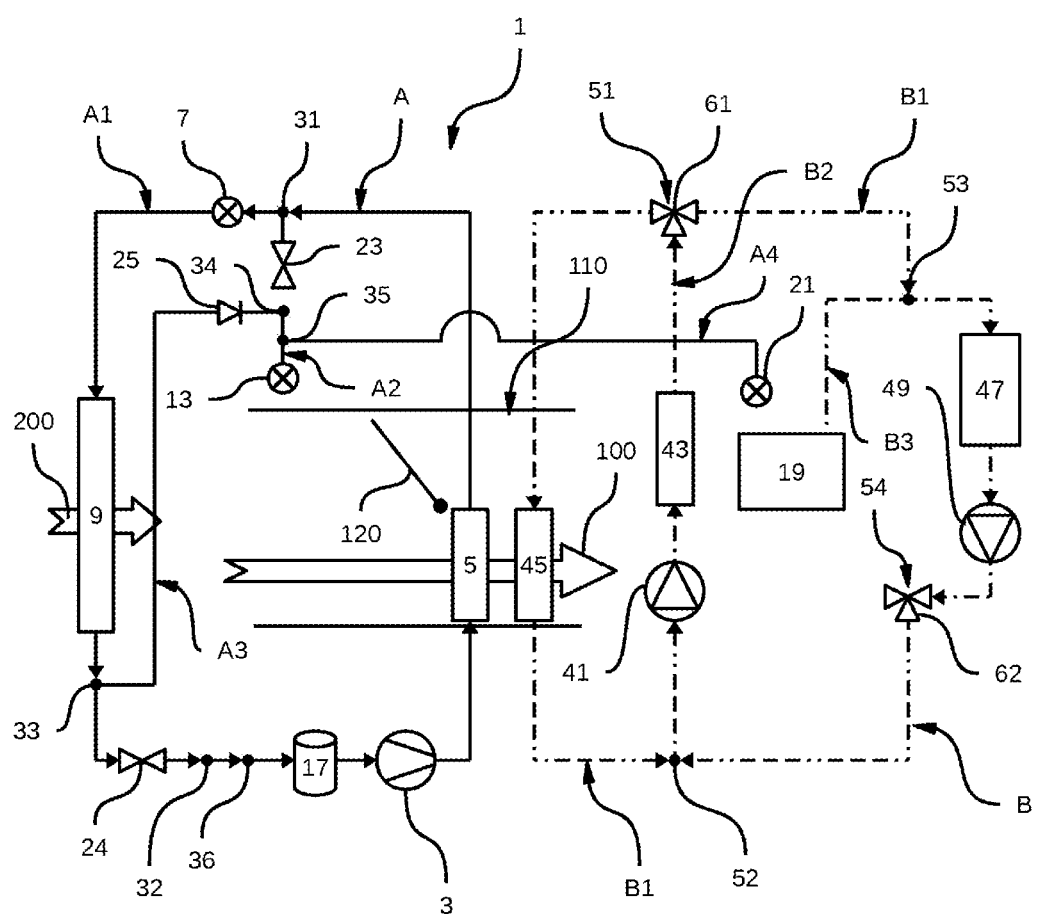

5) Heating of the Passenger Compartment and the Batteries:

FIG. 11 shows the thermal management circuit 1 according to an operating mode in which the passenger compartment and the batteries are heated. For this, the first circulation loop A and the second circulation loop B are in operation.

The first circulation loop A is more particularly in its heat pump mode in order to heat the internal air flow 100 via the second radiator 5.

The second circulation loop B is in a passenger compartment and battery heating mode. In this passenger compartment and battery heating mode, the heat-transfer fluid circulates successively in the second pump 41 and the electric heating device 43, in which the heat-transfer fluid is heated.

At the outlet of the electric heating device 43, a first portion of the heat-transfer fluid passes into the battery heat exchanger 47, in which the heat-transfer fluid heats the batteries, and into the second pump 41.

At the outlet of the electric heating device 43, a second portion of the heat-transfer fluid passes into the first radiator 45, in which the heat-transfer fluid heats the internal air flow 100.

These two portions of the heat-transfer fluid meet upstream of the second pump 41.

In this passenger compartment and battery heating mode, the heat-transfer fluid does not circulate in the third circulation branch B3 and does not therefore pass through the two-fluid heat exchanger 19.

Figure 12:
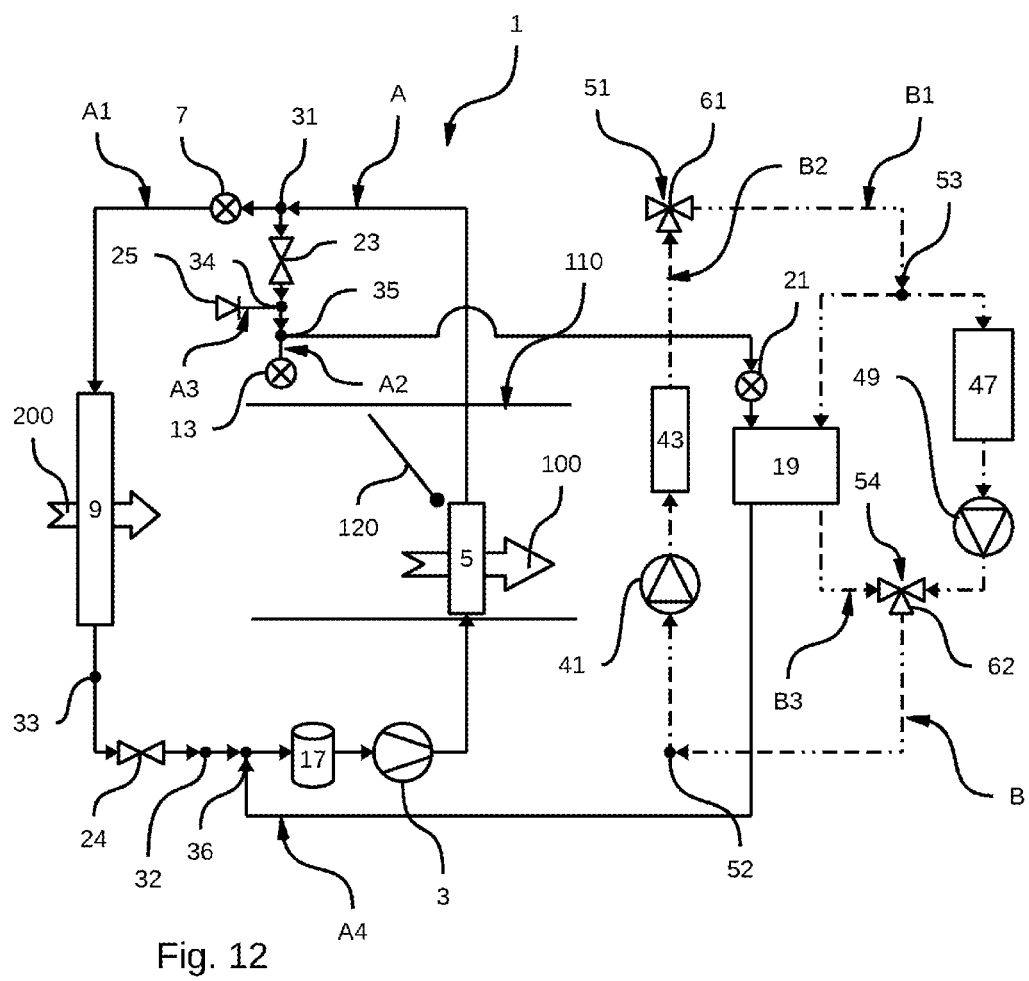
Figure 13:
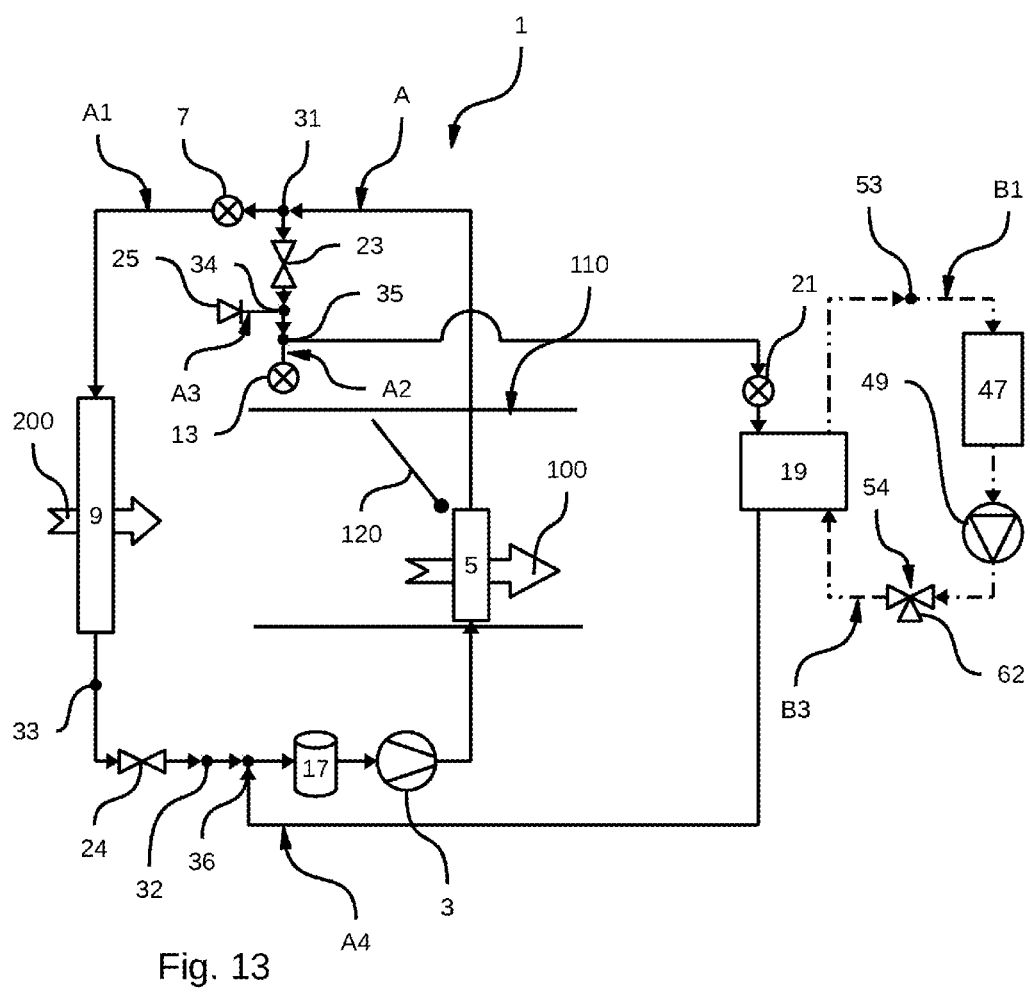
Figure 14:
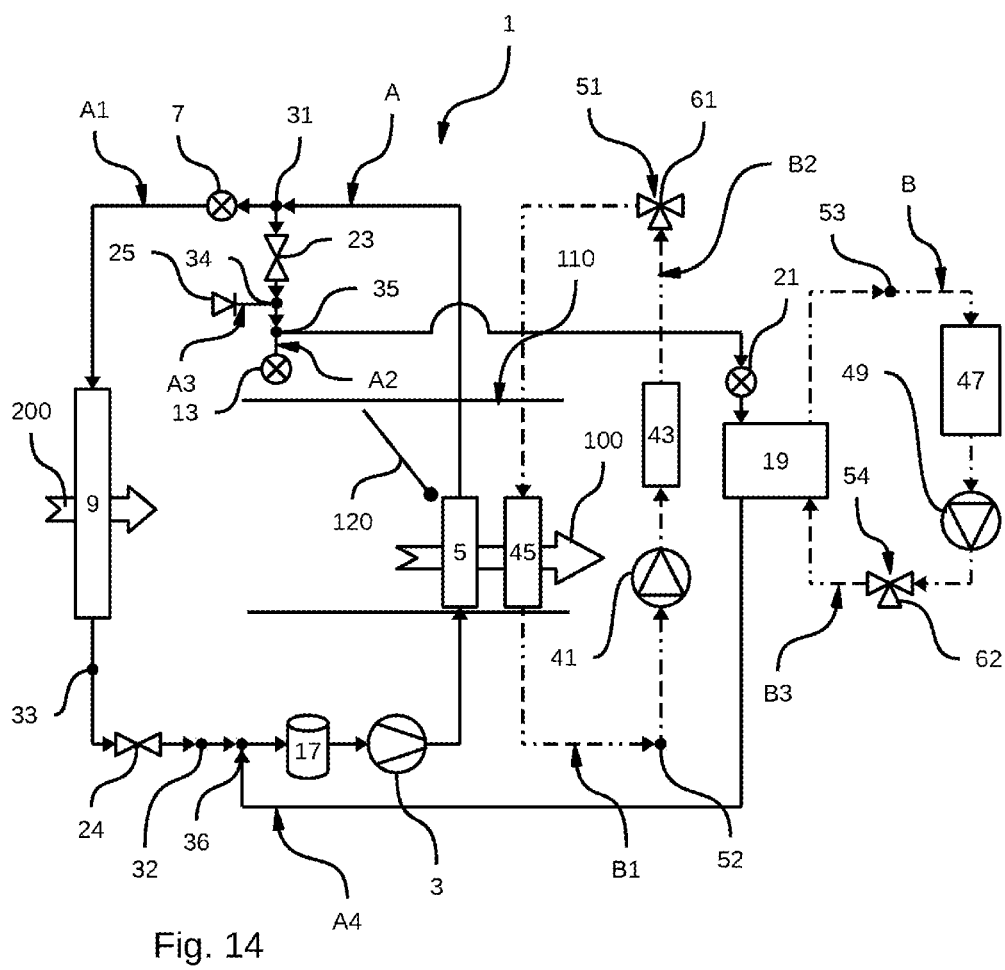

6) Heating of the Passenger Compartment and Cooling of the Batteries:

FIGS. 12 to 14 show the thermal management circuit 1 according to an operating mode in which only the passenger compartment is heated and in which the batteries are cooled. For this, the first circulation loop A and the second circulation loop B are in operation.

The first circulation loop A is in its heat pump mode as described above, with the difference that one portion of the refrigerant passes into the fourth circulation pipe A4. This portion of the refrigerant experiences a pressure drop in the third expansion device 21 and passes through the two-fluid heat exchanger 19, in which it absorbs heat energy from the heat-transfer fluid in the second circulation loop B before meeting the other portion of the refrigerant upstream of the compressor 3.

In this passenger compartment heating and battery cooling mode, illustrated in FIGS. 12 to 14, the portion of the refrigerant passing through the fourth circulation pipe A4 comes not from the third circulation pipe A3 but from the second circulation pipe A4, more specifically from the second radiator 5.

For the refrigerant to follow this path, the first 23 and second 24 shut-off valves are open and only the second expansion device 13 blocks the circulation of the refrigerant.

As illustrated in FIG. 12, the second circulation loop B can be configured to operate in its battery cooling mode, in which the heat-transfer fluid circulates successively in the second pump 41 and the electric heating device 43, through which the heat-transfer fluid passes without being heated, particularly because the electric heating device is not supplied with electricity and is not therefore producing heat.

A first portion of the heat-transfer fluid then passes through the third circulation branch B3 and thus passes through the two-fluid heat exchanger 19, in which the heat-transfer fluid transfers heat energy to the refrigerant.

A second portion of the heat-transfer fluid passes through the battery heat exchanger 47, where it absorbs heat energy from the batteries before passing into the first pump 49.

The two portions of heat-transfer fluid meet upstream of the second pump 41.

The fact that the heat-transfer fluid is propelled by both the first 49 and the second 41 pumps makes it possible to control the flow rate of the heat-transfer fluid passing through the two-fluid battery heat exchanger 19 and the battery heat exchanger 47. The second pump 41 makes it possible to define and control the flow rate of heat-transfer fluid passing through the two-fluid heat exchanger 19, and the first pump 49 makes it possible to define and control the flow rate of heat-transfer fluid passing through the battery heat exchanger 47. It is thus possible, by controlling these heat-transfer fluid flow rates, to accurately control the battery cooling capacity. Generally, the flow rate of the heat-transfer fluid passing through the two-fluid heat exchanger 19 is lower than the flow rate of the heat-transfer fluid passing through the battery heat exchanger 47.

As shown in FIG. 13, the second circulation loop B can conversely operate in a short operating mode described above in which the heat-transfer fluid circulates successively in the first pump 49, the two-fluid heat exchanger 19, and the battery heat exchanger 47.

In the case illustrated in FIG. 13, in the battery heat exchanger 47, the heat-transfer fluid absorbs heat energy originating from the batteries. This heat energy is then transferred to the refrigerant in the two-fluid heat exchanger.

As shown in FIG. 14, in order to increase the capacity to heat the internal air flow 100, when the second circulation loop B is operating in its short operating mode, the second circulation loop B can also be in a mode for the direct heating of the internal air flow 100. For this, the heat-transfer fluid circulates successively in the first pump 41, the electric heating device 43, which is operating and heats the heat-transfer fluid, and the first radiator 45, in which the heat-transfer fluid releases heat energy into the internal air flow 100. In this case, there are two separate heat-transfer fluid circulation loops within the second circulation loop B.

In this passenger compartment heating and battery cooling mode, the heat energy recovered at the batteries by the heat-transfer fluid and transmitted to the refrigerant is in particular used to heat the internal air flow 100 via the second radiator 5.

Figure 15:
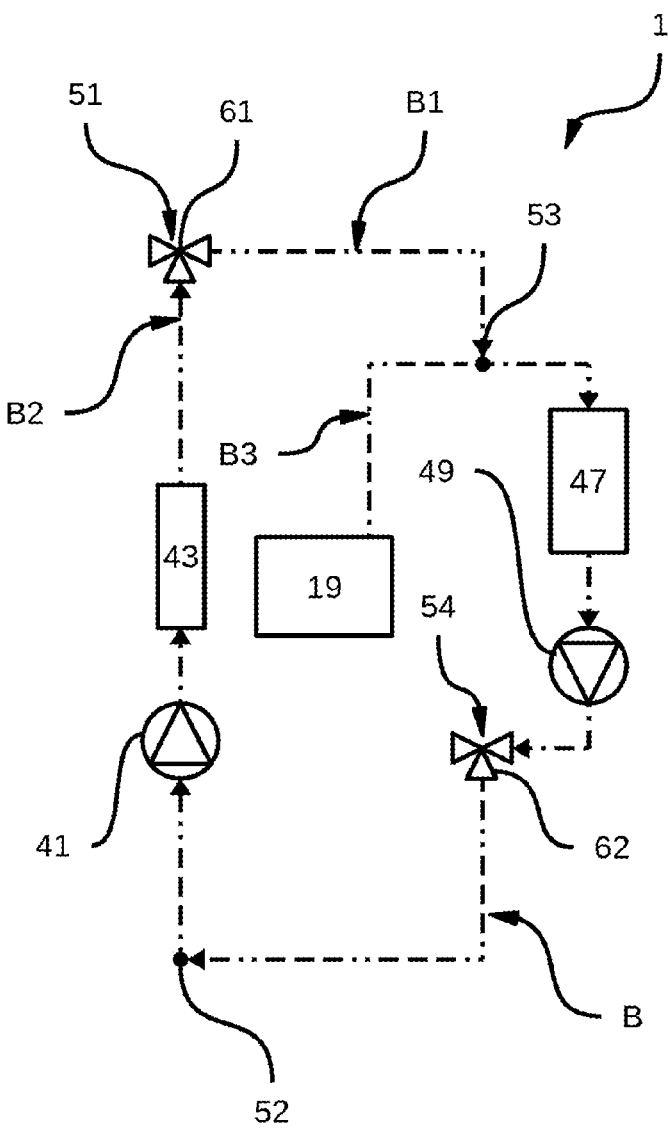

7) Simple Electric Heating of the Batteries:

FIG. 15 shows the thermal management circuit 1 according to a mode for simple electric heating of the batteries in which the second circulation loop B is in operation.

In this simple battery electric heating mode, the heat-transfer fluid circulates successively in the second pump 41, the electric heating device 43, in which the heat-transfer fluid is heated, and the battery heat exchanger 47, in which the heat-transfer fluid heats the batteries. The heat-transfer fluid then passes into the first pump 49 before reaching the second pump 41.

This simple battery electric heating mode can in particular be useful when the electric or hybrid vehicle is charging, for example plugged into a charging terminal, so that the batteries are at an optimum temperature for the charging thereof to be as quick and efficient as possible.

Figure 16:
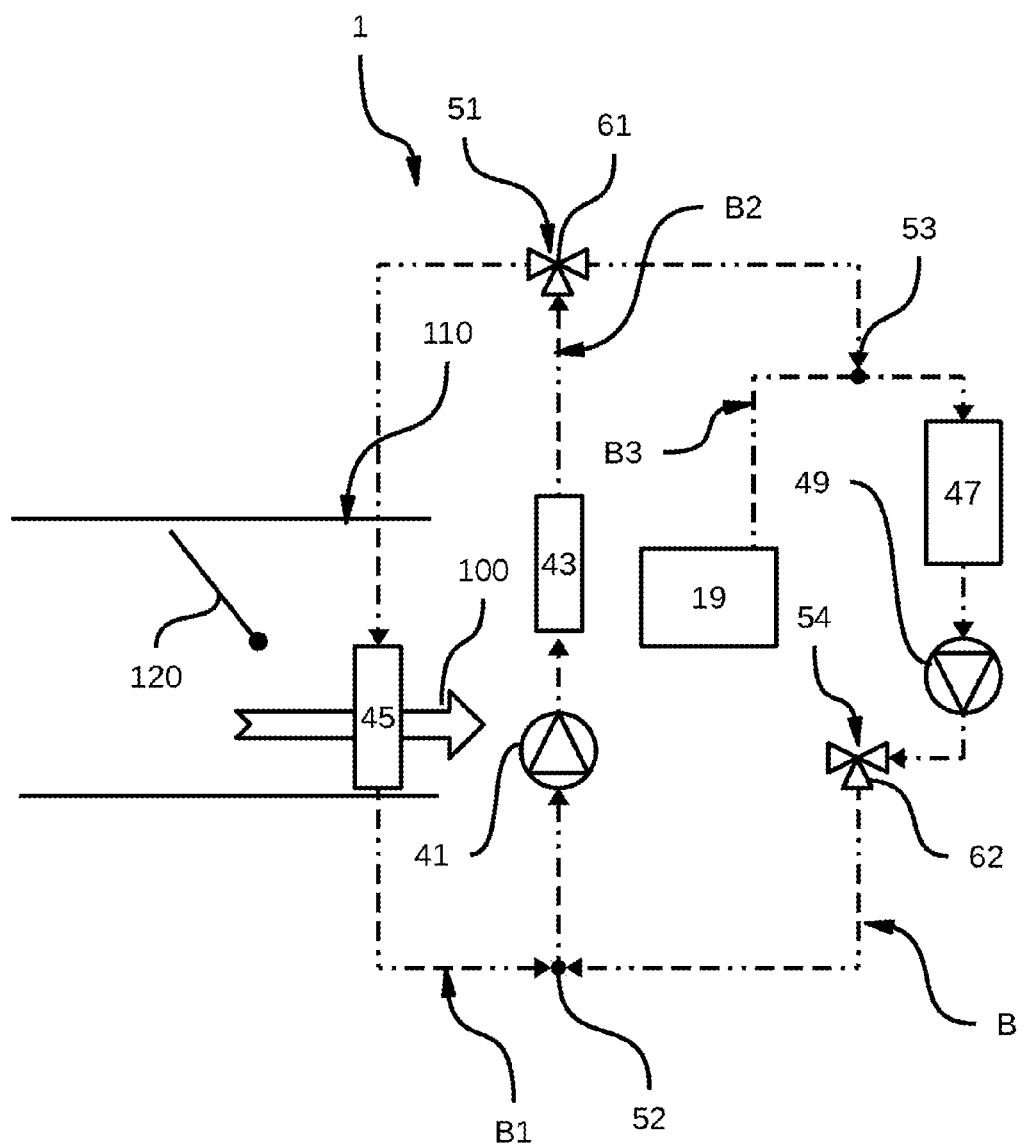

8) Simple Electric Heating of the Passenger Compartment and the Batteries:

FIG. 16 shows the thermal management circuit 1 according to a mode for simple electric heating of the passenger compartment and the batteries in which the second circulation loop B is in operation.

In this simple passenger compartment and battery electric heating mode, the heat-transfer fluid circulates successively in the second pump 41 and the electric heating device 43, in which the heat-transfer fluid is heated.

A first portion of the heat-transfer fluid then passes into the battery heat exchanger 47, in which the heat-transfer fluid heats the batteries. The heat-transfer fluid then passes into the first pump 49.

A second portion of the heat-transfer fluid passes into the first radiator 45, in which the heat-transfer fluid heats the internal air flow 100.

The two portions of the heat-transfer fluid meet upstream of the second pump 41.

This simple passenger compartment and battery electric heating mode can in particular be useful when the electric or hybrid vehicle is charging, for example plugged into a charging terminal, so that the batteries are at an optimum temperature for the charging thereof to be as quick and efficient as possible, while heating the passenger compartment, in particular when the external temperature is below 0° C.

Figure 17:
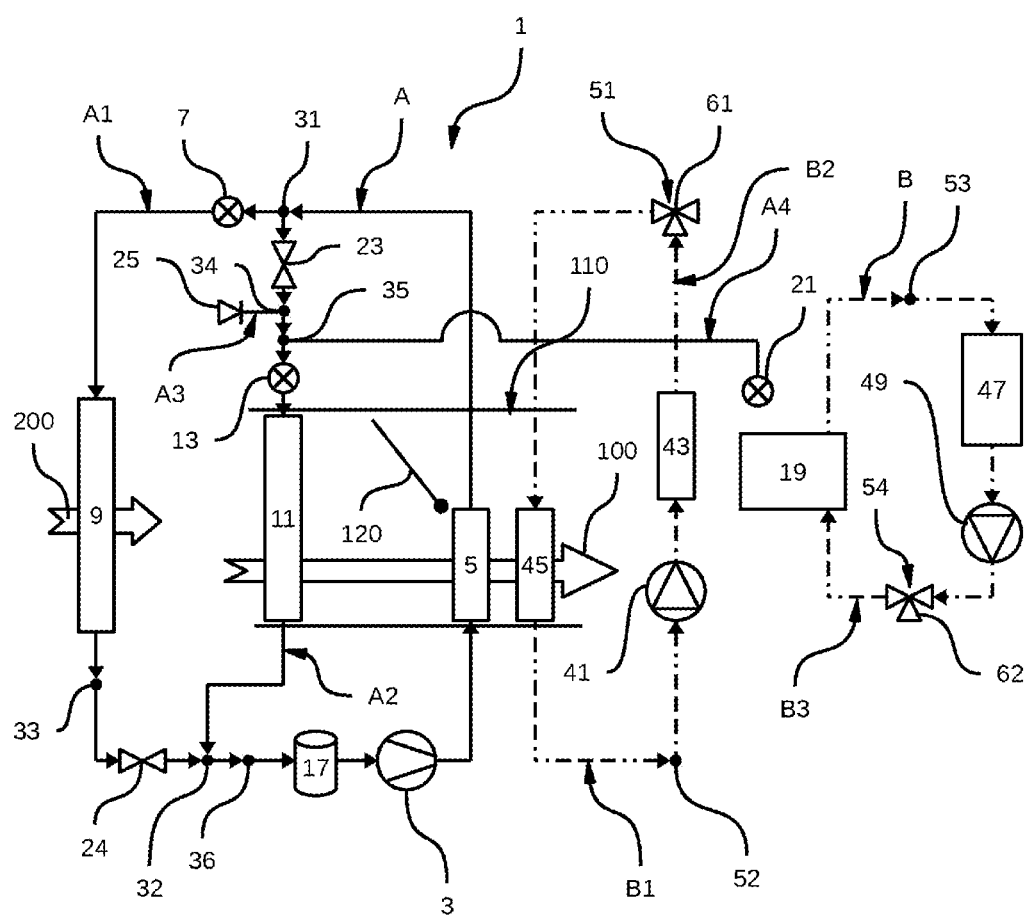

9) Heating of the Passenger Compartment with Heat Recovery:

FIGS. 17 and 18 show the thermal management circuit 1 according to an operating mode in which the passenger compartment is heated with heat recovery. In this operating mode, the second circulation loop B can in particular be in its so-called short operating mode. In this short operating mode, the heat-transfer fluid circulates successively in the first pump 49, the two-fluid heat exchanger 19 and the battery heat exchanger 47.

In the case illustrated in FIGS. 17 and 18, the heat-transfer fluid cannot exchange heat energy with the refrigerant as the refrigerant is not circulating in the fourth circulation pipe A4. Circulating the heat-transfer fluid according to this short operating mode nevertheless makes it possible to homogenize the temperature within the batteries so that the different cells forming them are at the same temperature.

In addition, in order to increase the capacity for heating the internal air flow 100, the second circulation loop B can also be in a mode for the direct heating of the internal air flow 100. For this, the heat-transfer fluid circulates successively in the first pump 41, the electric heating device 43, which is operating and heats the heat-transfer fluid, and the first radiator 45, in which the heat-transfer fluid releases heat energy into the internal air flow 100. In this case, there are two separate heat-transfer fluid circulation loops within the second circulation loop B.

As shown in FIG. 17, the first circulation loop A can operate according to a heat recovery mode in which the refrigerant circulates successively in:
- the compressor 3, where it experiences a pressure increase,
- the first radiator 5, in which the refrigerant transfers heat energy to the internal air flow 100,
- a first portion of the refrigerant passes through the first expansion device 7, where it experiences a pressure drop, and the evaporator-condenser 9, where the refrigerant absorbs heat energy from the external air flow 200,
- a second portion of the refrigerant passes through the second expansion device 13, where it experiences a pressure drop, and the evaporator 11, where the refrigerant absorbs heat energy from the internal air flow 100.

The two portions of the refrigerant meet upstream of the compressor 3.

For the refrigerant to follow this path, the first 23 and second 24 shut-off valves are open and only the third expansion device 21 blocks the circulation of the refrigerant.

This first heat recovery mode is particularly useful at an external temperature of between 10 and 25° C. and when the internal air flow 100 comes from recirculation of the air present in the passenger compartment.

As shown in FIG. 18, the first circulation loop A can operate according to a second heat recovery mode in which the refrigerant circulates successively in:
- the compressor 3, where it experiences a pressure increase,
- the first radiator 5, in which the refrigerant transfers heat energy to the internal air flow 100,
- the first expansion device 7, in which the refrigerant experiences a first pressure drop,
- the evaporator-condenser 9, in which the refrigerant absorbs heat energy from the external air flow 200,
- the third circulation pipe A3,
- the second expansion device 13, in which the refrigerant experiences a second pressure drop,
- the refrigerant then passes into the evaporator 11, in which it absorbs heat energy from the internal air flow 100 before returning to the compressor 3.

For the refrigerant to follow this path, the first 23 and second 24 shut-off valves are closed and only the third expansion device 21 blocks the circulation of the refrigerant.

This second heat recovery mode is particularly useful at an external temperature of between 0 and 10° C. and when the internal air flow 100 comes from recirculation of the air present in the passenger compartment.

FIG. 19 shows the thermal management circuit 1 according to a particular embodiment in which the first A and second B circulation loops are identical to those in FIG. 1, with the difference that the thermal management circuit 1 includes an additional two-fluid heat exchanger 20 arranged jointly on the first A and second B circulation loops.

This additional two-fluid heat exchanger 20 is arranged on the first circulation loop A downstream of the compressor 3, between said compressor 3 and the second radiator 5.

The additional two-fluid heat exchanger 20 is arranged on the second circulation loop B on the first circulation branch B1, downstream of the first compressor 49, more specifically between the second connection point 52 of the second circulation branch B2 and the first radiator 45.

This particular embodiment allows the thermal management circuit 1 to operate in a particular battery heating operating mode, illustrated in FIG. 20.

In this particular battery heating operating mode, in the first circulation loop A, the refrigerant passes successively into:
- the compressor 3, in which it experiences a pressure increase,
- the additional two-fluid heat exchanger 20, in which the refrigerant transfers heat energy to the heat-transfer fluid,
- the second radiator 5, through which the refrigerant passes without exchanging heat with the internal air flow 100, for example because flap 120 is closed,
- the first expansion device 7, in which the refrigerant experiences a pressure drop,
- the evaporator-condenser 9, in which the refrigerant absorbs heat energy from the external air flow 200 before returning to the compressor 3.

In the second circulation loop B, the heat-transfer fluid circulates successively in:
- the first pump 49,
- the additional two-fluid heat exchanger 20, in which the heat-transfer fluid recovers heat energy from the refrigerant,
- the first radiator 45, through which the refrigerant passes without exchanging heat with the internal air flow 100, for example because the flap 120 is closed and also blocks the circulation of the internal air flow 100 upstream of the first radiator 45,
- the battery heat exchanger 47, in which the heat-transfer fluid releases the heat energy gained in order to heat the batteries.

Here, the heat-transfer fluid does not pass into the second B2 and third B3 circulation branches.

It is thus clear that due to its particular architecture, the thermal management circuit 1 makes it possible to heat the batteries directly via the electric heating device 43. In addition, it is also possible to separate the heating or cooling of the batteries from that of the passenger compartment.

The invention claimed is:

1. A thermal management circuit for a hybrid or electric vehicle, said thermal management circuit comprising:
   a first reversible air conditioning loop in which a refrigerant circulates; and
   a two-fluid heat exchanger arranged jointly on a second loop for the circulation of a heat-transfer fluid,
   the second loop for the circulation of a heat-transfer fluid comprising:
      a first circulation branch including in the direction in which the heat-transfer fluid circulates, a first pump, a first radiator arranged in an internal air flow, and a battery heat exchanger,
      a second circulation branch connected in parallel with the second radiator and including a second pump and an electric device for heating the heat-transfer fluid,
      a third circulation branch connected in parallel with the first pump and the battery heat exchanger, said third circulation branch including the two-fluid heat exchanger.

2. The thermal management circuit as claimed in claim 1, wherein the first reversible air conditioning loop includes:
   a first circulation pipe including in the direction in which the refrigerant circulates, a compressor, a second radiator arranged in the internal air flow, a first expansion device, and an evaporator-condenser arranged in an external air flow, a second circulation pipe connected in parallel with the evaporator-condenser and including a second expansion device and an evaporator arranged in the internal air flow, a third circulation pipe connecting the outlet of the evaporator-condenser and the inlet of the second expansion device, and a fourth circulation pipe connecting the inlet of the second expansion device and the inlet of the compressor, said third circulation pipe including a third expansion device and the two-fluid heat exchanger.

3. The thermal management circuit as claimed in claim 2, wherein:

the first reversible air conditioning loop is configured to operate in a first cooling mode in which the refrigerant circulates successively in the compressor, where the refrigerant experiences a pressure increase, in the first radiator, through which the refrigerant passes without exchanging heat energy with the internal air flow, in the first expansion device, through which the refrigerant passes without experiencing a pressure drop, and in the evaporator-condenser, in which the refrigerant releases heat energy into the external air flow, and the refrigerant then reaches the second expansion device, where the refrigerant experiences a pressure drop via the third circulation pipe, and the refrigerant then passes through the evaporator, where it absorbs heat energy from the internal air flow before returning to the compressor.

4. The thermal management circuit as claimed in claim 3, wherein in the first circulation loop, a portion of the refrigerant passes into the fourth circulation pipe, the refrigerant experiencing a pressure drop in the third expansion device and passing through the two-fluid heat exchanger, in which it absorbs heat energy from the heat-transfer fluid in the second circulation loop, before meeting the other portion of the refrigerant upstream of the compressor.

5. The thermal management circuit as claimed in claim 4, wherein the second circulation loop is configured to operate in a battery cooling mode in which the heat-transfer fluid circulates successively in the second pump and the electric heating device, through which the heat-transfer fluid passes without being heated, wherein the heat-transfer fluid then circulates in the battery heat exchanger, where the fluid absorbs heat energy from the batteries before passing into the first pump, the refrigerant also circulates in the third circulation branch and thus passes through the two-fluid heat exchanger, in which the heat-transfer fluid transfers heat energy to the refrigerant.

6. The thermal management circuit as claimed in claim 2, wherein the first reversible air conditioning loop is configured to operate in a heat pump mode in which the refrigerant circulates successively in the compressor, where the refrigerant experiences a pressure increase, the first radiator, in which the refrigerant transfers heat energy to the internal air flow, the first expansion device, where the refrigerant experiences a pressure drop, and the evaporator-condenser, in which the refrigerant absorbs heat energy from the external air flow before returning to the compressor.

7. The thermal management circuit as claimed in claim 6, wherein the second circulation loop is configured to operate in a passenger compartment and battery heating mode in which the heat-transfer fluid circulates successively in the second pump and the electric heating device, in which the heat-transfer fluid is heated, a first portion of the heat-transfer fluid then passing into the battery heat exchanger, in which the heat-transfer fluid heats the batteries, and into the first pump, a second portion of the heat-transfer fluid then passing into the first radiator, in which the heat-transfer fluid heats the internal air flow, the two portions of the heat-transfer fluid meeting upstream of the second pump.

8. The thermal management circuit as claimed in claim 2, wherein the first circulation loop is configured to operate in a second cooling mode in which the refrigerant circulates successively in the compressor, where the refrigerant experiences a pressure increase, the first radiator, through which the refrigerant passes without exchanging heat energy with the internal air flow, the first expansion device, through which the refrigerant passes without experiencing a pressure drop, and the evaporator-condenser, in which the refrigerant releases heat energy into the external air flow, and;

wherein the refrigerant then passes into the third circulation pipe, passes into the third expansion device, where the refrigerant experiences a pressure drop, and the refrigerant then passes through the two-fluid heat exchanger, where the refrigerant absorbs heat energy coming from the heat-transfer fluid before returning to the compressor.

9. The thermal management circuit as claimed in claim 1, wherein the second circulation loop is configured to operate in a mode for the direct heating of the internal air flow in which the heat-transfer fluid circulates successively in the second pump, the electric heating device, in which the heat-transfer fluid is heated, and the first radiator, in which the heat-transfer fluid heats the internal air flow.

10. The thermal management circuit as claimed in claim 1 the second circulation loop is configured to operate in a short operating mode in which the heat-transfer fluid circulates successively in the first pump, the two-fluid heat exchanger, and the battery heat exchanger.

* * * * *